US008602869B2

(12) United States Patent
Nicely et al.

(10) Patent No.: US 8,602,869 B2
(45) **Date of Patent: *Dec. 10, 2013**

(54) GAMING SYSTEM, GAMING DEVICE, AND METHOD PROVIDING A GAME WITH MULTI-COMPONENT SYMBOLS AND AWARDS BASED ON COMMON COMPONENTS

(75) Inventors: Mark C. Nicely, Daly City, CA (US); Bryan D. Wolf, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/246,508

(22) Filed: Sep. 27, 2011

(65) Prior Publication Data

US 2013/0079099 A1 Mar. 28, 2013

(51) Int. Cl.
*G06F 17/00* (2006.01)

(52) U.S. Cl.
USPC ........................................................ 463/20

(58) Field of Classification Search
USPC ........................................................ 463/16–25
See application file for complete search history.

(56) References Cited

U.S. PATENT DOCUMENTS

| | | | |
|---|---|---|---|
| 5,205,555 | A | 4/1993 | Hamano |
| 5,224,706 | A | 7/1993 | Bridgeman et al. |
| 5,332,219 | A | 7/1994 | Marnell et al. |
| 5,332,228 | A | 7/1994 | Schultz |
| 5,393,057 | A | 2/1995 | Marnell |
| 5,531,440 | A | 7/1996 | Dabrowski et al. |
| 5,743,526 | A | 4/1998 | Inoue |
| 5,833,537 | A | 11/1998 | Barrie |
| 5,980,384 | A | 11/1999 | Barrie |
| 6,095,921 | A | 8/2000 | Walker et al. |
| 6,120,031 | A | 9/2000 | Adams |

(Continued)

FOREIGN PATENT DOCUMENTS

| | | |
|---|---|---|
| EP | 0 410 789 A2 | 2/1990 |
| EP | 0 737 494 A1 | 12/1994 |

(Continued)

OTHER PUBLICATIONS iTunes App Store Alien Glyphs game; URL: http://itunes.apple.com/us/app/alien-glyphs/id331605325?Emt=8; copyright 2011 to Apple, Inc.; printed Sep. 26, 2011 (3 pages).
European Search Report for corresponding European Patent Application No. 12181482.6, dated Dec. 12, 2012 (7 pages).

*Primary Examiner* — Ronald Laneau
(74) *Attorney, Agent, or Firm* — Neal, Gerber & Eisenberg LLP

(57) ABSTRACT

The gaming system receives a wager from a player for a play of a game including a plurality of multi-component symbols. Each of the multi-component symbols includes a plurality of symbol component locations. A plurality of the multi-component symbols include at least one of the symbol components in at least one of the symbol component locations. The gaming system randomly generates and displays a plurality of the multi-component symbols. The gaming system determines, for a first one of a designated number of the displayed multi-component symbols, a quantity of symbol component locations of the first one of the displayed multi-component symbols that display one of the symbol components and that correspond to a symbol component location of each of the other displayed multi-component symbols of the designated number of the displayed multi-component symbols that each display one of the symbol components. Any awards are determined based on the determined quantity.

29 Claims, 18 Drawing Sheets

(56) References Cited

U.S. PATENT DOCUMENTS 6,234,897 B1 5/2001 Frohm et al.
6,261,177 B1 7/2001 Bennett
6,270,411 B1 8/2001 Gura et al.
6,290,600 B1 9/2001 Glasson
6,312,334 B1 11/2001 Yoseloff
6,322,078 B1 11/2001 Adams
6,328,649 B1 12/2001 Randall et al.
6,334,814 B1 1/2002 Adams
6,346,043 B1 2/2002 Colin et al.
6,375,570 B1 4/2002 Poole
6,413,162 B1 7/2002 Baerlocher et al.
6,428,412 B1 8/2002 Anderson et al.
6,464,582 B1 10/2002 Baerlocher et al.
6,494,454 B2 12/2002 Adams
6,517,433 B2 2/2003 Loose et al.
6,554,703 B1 4/2003 Bussick et al.
6,554,704 B2 4/2003 Nicastro et al.
6,561,900 B1 5/2003 Baerlocher et al.
6,561,904 B2 5/2003 Locke et al.
6,565,433 B1 5/2003 Baerlocher et al.
6,569,015 B1 5/2003 Baerlocher et al.
6,616,142 B2 9/2003 Adams
6,632,139 B1 10/2003 Baerlocher
6,638,164 B2 10/2003 Randall et al.
6,669,559 B1 12/2003 Baerlocher et al.
6,672,960 B1 1/2004 B-Jensen
6,692,355 B2 2/2004 Baerlocher et al.
6,702,675 B2 3/2004 Poole et al.
6,719,630 B1 4/2004 Seelig et al.
6,726,563 B1 4/2004 Baerlocher et al.
6,731,313 B1 5/2004 Kaminkow
6,746,328 B2 6/2004 Cannon et al.
6,749,502 B2 6/2004 Baerlocher
6,780,109 B2 8/2004 Kaminkow
6,786,818 B1 9/2004 Rothschild et al.
6,805,349 B2 10/2004 Baerlocher et al.
6,805,632 B2 10/2004 Suda
6,808,454 B2 10/2004 Gerrard et al.
6,840,858 B2 1/2005 Adams
6,855,053 B2 2/2005 Baerlocher
6,855,054 B2 2/2005 White et al.
6,866,583 B2 3/2005 Glavich et al.
6,878,061 B2 4/2005 Baerlocher et al.
6,905,405 B2 6/2005 Mcclintic
6,905,406 B2 6/2005 Kaminkow et al.
6,918,832 B2 7/2005 Baerlocher et al.
6,921,335 B2 7/2005 Rodgers et al.
6,929,952 B2 8/2005 Baerlocher
6,939,223 B1 9/2005 Jones
6,939,229 B2 9/2005 Mcclintic
6,964,416 B2 11/2005 Mcclintic et al.
6,971,954 B2 12/2005 Randall et al.
6,981,635 B1 1/2006 Hughs-Baird et al.
6,988,947 B2 1/2006 Baerlocher et al.
6,997,808 B2 2/2006 Rodgers et al.
7,040,983 B2 5/2006 Dolloff et al.
7,056,209 B2 6/2006 Baerlocher et al.
7,056,213 B2 6/2006 Ching et al.
7,059,967 B2 6/2006 Baerlocher
7,070,502 B1 7/2006 Bussick et al.
7,074,127 B2 7/2006 Cuddy et al.
7,090,580 B2 8/2006 Rodgers et al.
7,094,148 B2 8/2006 Baerlocher et al.
7,128,646 B2 10/2006 Baerlocher et al.
7,137,888 B2 11/2006 Glavich et al.
7,169,042 B2 1/2007 Muir et al.
7,229,350 B2 6/2007 Baerlocher et al.
7,258,611 B2 8/2007 Bigelow, Jr. et al.
7,281,977 B2 10/2007 Jones
7,294,055 B2 11/2007 Baerlocher et al.
7,331,862 B2 2/2008 Rodgers et al.
7,341,512 B2 3/2008 Dolloff et al.
7,371,168 B2 5/2008 Bilyeu et al.
7,371,170 B2 5/2008 Cregan et al.
7,381,134 B2 6/2008 Cuddy et al.
7,399,226 B2 7/2008 Mishra
7,402,102 B2 7/2008 Marks et al.
7,448,948 B2 11/2008 Hughs-Baird et al.
7,494,412 B2 2/2009 Baerlocher
7,517,281 B2 * 4/2009 Baerlocher .................... 463/25
7,526,736 B2 4/2009 Kaminkow et al.
7,578,737 B2 8/2009 Cregan et al.
7,578,738 B2 8/2009 Cregan et al.
7,690,981 B2 * 4/2010 Ching et al. .................... 463/20
7,794,320 B2 * 9/2010 Baerlocher et al. ............. 463/20
7,850,521 B2 12/2010 Rodgers et al.
7,922,573 B2 4/2011 Baerlocher et al.
8,002,625 B2 8/2011 Maya
8,216,065 B2 * 7/2012 Kaminkow et al. ............. 463/30
2003/0045354 A1 3/2003 Giobbi
2003/0048651 A1 3/2003 Trimble et al.
2003/0060267 A1 3/2003 Glavich et al.
2003/0064768 A1 4/2003 Fier
2003/0162585 A1 8/2003 Bigelow, Jr. et al.
2003/0190945 A1 10/2003 Bussick et al.
2003/0203753 A1 10/2003 Muir et al.
2004/0020344 A1 2/2004 Bazata
2004/0053677 A1 3/2004 Hughs-Baird
2004/0067790 A1 4/2004 Peterson et al.
2004/0077396 A1 4/2004 Poole et al.
2004/0121838 A1 6/2004 Hughs-Baird et al.
2004/0171416 A1 9/2004 Baerlocher et al.
2004/0171420 A1 9/2004 Baerlocher et al.
2004/0185928 A1 9/2004 Baerlocher et al.
2004/0242316 A1 12/2004 Oles et al.
2004/0248641 A1 12/2004 Jarvis et al.
2005/0043081 A1 2/2005 Baerlocher
2005/0049035 A1 3/2005 Baerlocher et al.
2005/0054418 A1 3/2005 Baerlocher
2005/0054420 A1 3/2005 Cregan et al.
2005/0054436 A1 3/2005 Frizzell et al.
2005/0059461 A1 * 3/2005 Ching et al. .................... 463/16
2005/0059477 A1 3/2005 Baerlocher
2005/0059478 A1 3/2005 Peterson et al.
2005/0064924 A1 3/2005 Glavich et al.
2005/0071023 A1 3/2005 Gilliland et al.
2005/0096121 A1 5/2005 Gilliland et al.
2005/0148384 A1 7/2005 Marks et al.
2005/0170876 A1 8/2005 Masci et al.
2005/0227754 A1 10/2005 Kaminkow et al.
2006/0019738 A1 1/2006 Baerlocher et al.
2006/0030392 A1 2/2006 Rodgers et al.
2006/0063584 A1 3/2006 Brill et al.
2006/0068875 A1 3/2006 Cregan et al.
2006/0068883 A1 3/2006 Randall et al.
2006/0073876 A1 4/2006 Cuddy
2006/0073879 A1 4/2006 Baerlocher
2006/0084492 A1 4/2006 Baerlocher et al.
2006/0084493 A1 4/2006 Pederson et al.
2006/0084494 A1 4/2006 Belger et al.
2006/0089191 A1 4/2006 Singer et al.
2006/0121974 A1 6/2006 Rodgers et al.
2006/0172795 A1 8/2006 Bussick et al.
2006/0189364 A1 8/2006 Baerlocher
2006/0199636 A1 9/2006 Ching et al.
2006/0199637 A1 9/2006 Ching et al.
2006/0205465 A1 9/2006 Dolloff et al.
2007/0004489 A1 1/2007 Rodgers et al.
2007/0010316 A1 1/2007 Baerlocher et al.
2007/0021176 A1 1/2007 Jackson
2007/0060248 A1 3/2007 Rodgers et al.
2007/0060274 A1 3/2007 Rowe et al.
2007/0060287 A1 3/2007 Reddicks et al.
2007/0167217 A1 * 7/2007 Kaminkow et al. ............. 463/20
2007/0281778 A1 12/2007 Bigelow et al.
2007/0287526 A1 12/2007 Sato
2008/0085759 A1 4/2008 Bilyeu et al.
2008/0113735 A1 5/2008 Maya
2008/0139298 A1 6/2008 Rodgers et al.
2008/0182650 A1 7/2008 Randall et al.
2008/0200237 A1 8/2008 Cuddy et al.
2008/0200238 A1 8/2008 Mishra
2008/0280673 A1 11/2008 Marks et al.
2009/0111559 A1 4/2009 Souza et al.

(56) References Cited

U.S. PATENT DOCUMENTS

| | | | |
|---|---|---|---|
| 2009/0118004 | A1 | 5/2009 | Hoffman |
| 2009/0124347 | A1 | 5/2009 | Rodgers et al. |
| 2010/0029364 | A1 | 2/2010 | Zielinski |
| 2010/0120496 | A1 | 5/2010 | Hoffman et al. |
| 2010/0120501 | A1 | 5/2010 | Hoffman et al. |
| 2010/0120507 | A1 | 5/2010 | Rodgers et al. |
| 2011/0086695 | A1 | 4/2011 | Evans |

FOREIGN PATENT DOCUMENTS

| | | | |
|---|---|---|---|
| EP | 0 926 645 | A2 | 6/1999 |
| EP | 0 944 030 | A2 | 9/1999 |
| EP | 1 039 424 | A2 | 3/2000 |
| EP | 1 063 622 | A2 | 5/2000 |
| GB | 2 107 103 | A | 4/1983 |
| WO | WO 97/31344 | A1 | 8/1997 |
| WO | WO 97/32285 | A1 | 9/1997 |

* cited by examiner

GAMING SYSTEM, GAMING DEVICE, AND METHOD PROVIDING A GAME WITH MULTI-COMPONENT SYMBOLS AND AWARDS BASED ON COMMON COMPONENTS

CROSS REFERENCE TO RELATED APPLICATIONS

This application relates to the following co-pending commonly owned patent application: "GAMING SYSTEM, GAMING DEVICE, AND METHOD PROVIDING A GAME WITH MULTI-COMPONENT SYMBOLS AND AWARDS BASED ON COMMON COMPONENTS," U.S. patent application Ser. No. 13/246,497.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

To increase player enjoyment and excitement, and to increase the popularity of gaming devices, gaming device manufacturers constantly strive to provide players with new types of gaming devices that attract the player and keep the player entertained.

Many gaming devices generate and display symbols in response to a wager by a player. For example, certain gaming devices employ a plurality of reels, wherein the reels each have a plurality of symbols. These gaming devices enable a player to place a wager on one or more paylines associated with symbol positions. One or more of the symbols on each of the reels are independently generated from symbols on each of the other reels to provide a combination of symbols displayed at the symbol positions. A single activation of the set of reels typically leads to a single display of symbols arranged along the paylines to be evaluated for any awards. If a winning symbol or winning combination of symbols is generated and displayed at the symbol display positions along a wagered-on payline, an award is provided to the player for that payline. If a winning symbol or combination of symbols is not generated and displayed at the symbol display positions along a wagered on payline, no award is provided to the player for that payline.

Gaming device manufacturers strive to make gaming devices that provide as much enjoyment and excitement as possible. Players are also attracted to gaming devices that provide new game schemes and interactive features including different ways of determining awards associated with winning symbol combinations or different types of triggering events. Therefore, to increase player enjoyment and excitement, it is desirable to provide players with new game schemes and features for gaming devices which include new and different ways of evaluating generated symbols. A continuing need thus exists to provide new and exciting gaming systems, devices, and methods.

SUMMARY

The present disclosure describes various embodiments related to gaming systems, gaming devices, and methods providing a game with multi-component symbols and awards based on common components. In general, the gaming system generates and displays a plurality of multi-component symbols and determines whether a designated number of the displayed multi-component symbols each include common symbol components at corresponding symbol component locations (i.e., share common symbol components). The gaming system determines any awards based on the quantity of symbol components shared between or among the designated number of the displayed multi-component symbols.

In one example embodiment, the game providing multi-component symbols and awards based on common components includes a plurality of different multi-component symbols. The multi-component symbols are displayable at a plurality of symbol display areas. Each of the multi-component symbols includes a plurality of symbol component locations. For each of a plurality of the multi-component symbols, that multi-component symbol includes at least one of a plurality of different symbol components at at least one of the symbol component locations of that multi-component symbol. For a play of this embodiment of the game providing multi-component symbols and awards based on common components, the gaming system randomly generates and displays a plurality of the multi-component symbols at the symbol display areas. For each of a designated number of the displayed multi-component symbols, each of at least one of the symbol component locations of that displayed multi-component symbol corresponds to one of the symbol component locations of each of the other displayed multi-component symbols of the designated number of the displayed multi-component symbols. The designated number is at least two. The gaming system determines a quantity of the symbol component locations of a first one of the displayed multi-component symbols of the designated number of the displayed multi-component symbols that: (a) display one of the symbol components, and (b) correspond to one of the symbol component locations of each of the other displayed multi-component symbols of the designated number of the displayed multi-component symbols that each display one of the symbol components. The gaming system determines any awards based on the determined quantity, and provides any determined awards.

In another example embodiment, the game providing multi-component symbols and awards based on common components includes a plurality of different multi-component symbols. The multi-component symbols are displayable at a plurality of symbol display areas. Each of the multi-component symbols includes a plurality of symbol component locations. For each of a plurality of the multi-component symbols, that multi-component symbol includes at least one of a plurality of different symbol components at at least one of the symbol component locations of that multi-component symbol. For a play of this embodiment of the game providing multi-component symbols and awards based on common components, the gaming system randomly generates and displays a plurality of the multi-component symbols at the symbol display areas. For each of a designated number of the displayed multi-component symbols, each of at least one of the symbol component locations of that displayed multi-component symbol corresponds to one of the symbol component locations of each of the other displayed multi-component symbols of the designated number of the displayed multi-component symbols. The designated number is at least two. The gaming system determines a quantity of the symbol component locations of a first one of the displayed multi-component symbols of the designated number of the displayed multi-component symbols that: (a) display one of the symbol components, and (b) correspond to one of the symbol component locations of each of the other displayed multi-component symbols of the designated number of the displayed multi-component symbols that each display one of the symbol components that corresponds to that displayed symbol component. The gaming system determines any awards based on that determined quantity, and provides any determined awards. In one embodiment, identical symbol components correspond to one another.

In another example embodiment, the game providing multi-component symbols and awards based on common components includes a plurality of different multi-component symbols. The multi-component symbols are displayable at a plurality of symbol display areas. Each of the multi-component symbols includes a plurality of symbol component locations. For each of a plurality of the multi-component symbols, that multi-component symbol includes at least one of a plurality of different symbol components. For a play of this embodiment of the game providing multi-component symbols and awards based on common components, the gaming system randomly generates and displays a plurality of the multi-component symbols at the symbol display areas. For a first one of a designated number of the displayed multi-component symbols, the gaming system determines a quantity of the symbol components of that first one of the displayed multi-component symbols that are also included in each of the other displayed multi-component symbols of the designated number of the displayed multi-component symbols. The designated number is at least two. The gaming system determines any awards based on that determined quantity, and provides any determined awards.

Additional features and advantages are described herein, and will be apparent from, the following Detailed Description and the Figures.

DETAILED DESCRIPTION

Gaming Device and Electronics

The present disclosure may be implemented in various configurations for gaming machines, gaming devices, or gaming systems, including but not limited to: (1) a dedicated gaming machine, gaming device, or gaming system wherein the computerized instructions for controlling any games (that are provided by the gaming machine or gaming device) are provided with the gaming machine or gaming device prior to delivery to a gaming establishment; and (2) a changeable gaming machine, gaming device, or gaming system wherein the computerized instructions for controlling any games (that are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling the game providing multi-component symbols and awards based on common components of the present disclosure are communicated from the central server to the gaming device in a thick client configuration and computerized instructions for controlling any secondary or bonus games or functions are executed by a central server in a thin client configuration.

Figure 1A:
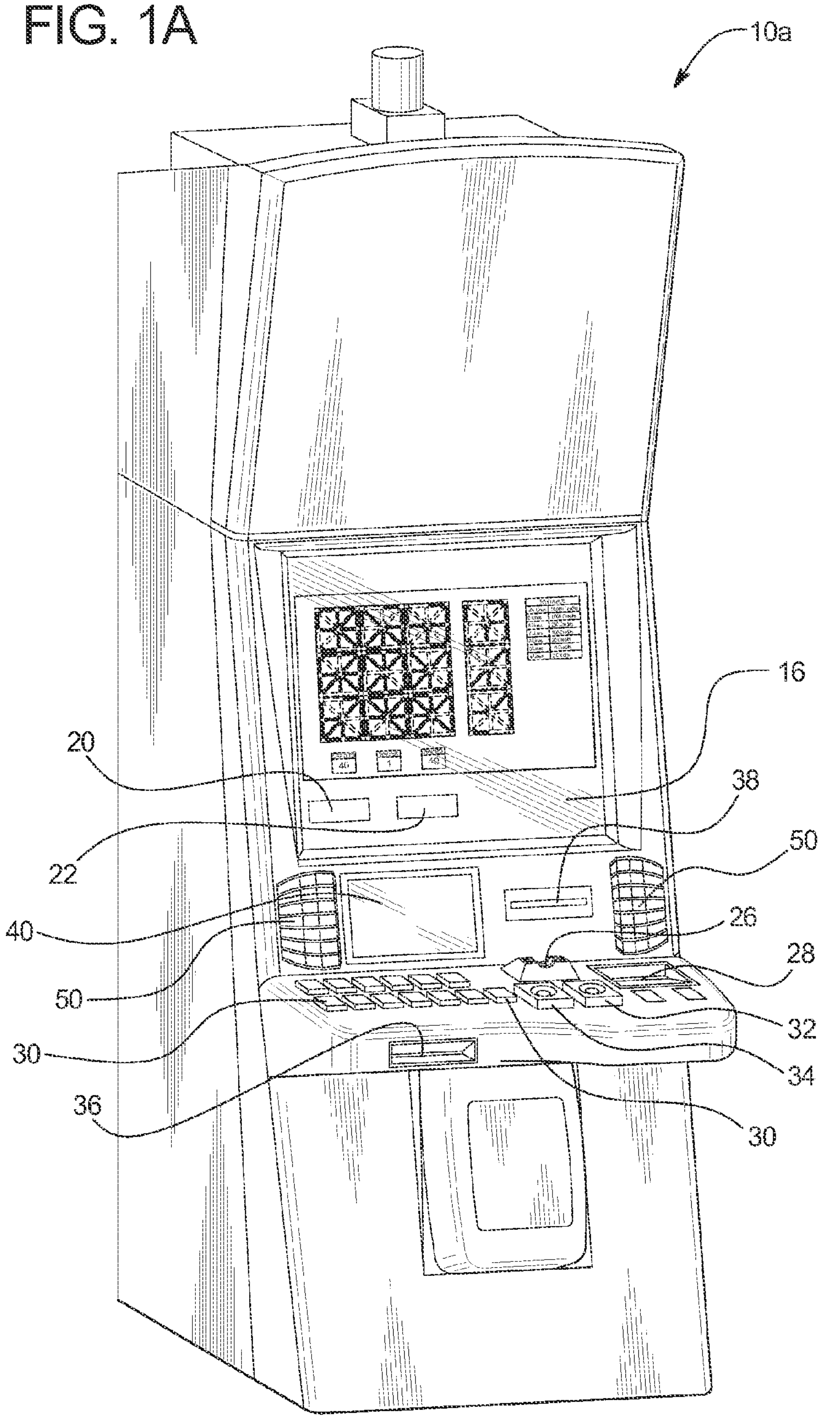
FIGS. 1A and 1B are perspective views of example alternative embodiments of the gaming device of the present disclosure.
Figure 1B:
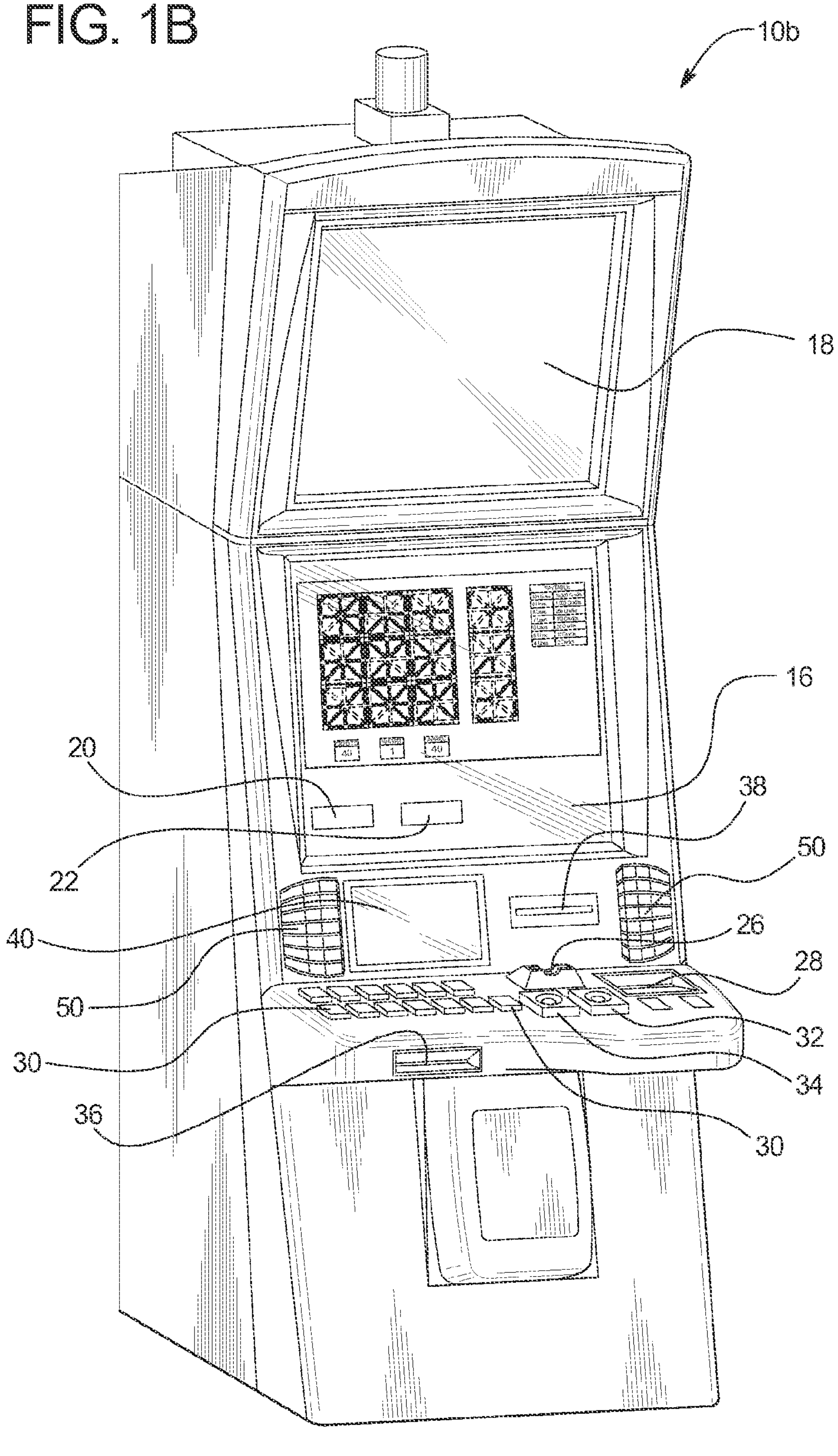

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet that provides support for a plurality of displays, inputs, controls, and other features of a conventional gaming machine. It is configured so that a player may operate it while standing or sitting. The gaming device may be positioned on a base or stand or may be configured as a pub-style table-top game (not shown) that a player may operate preferably while sitting. As illustrated by the different configurations shown in FIGS. 1A and 1B, the gaming device may have varying cabinet and display configurations.

Figure 2A:
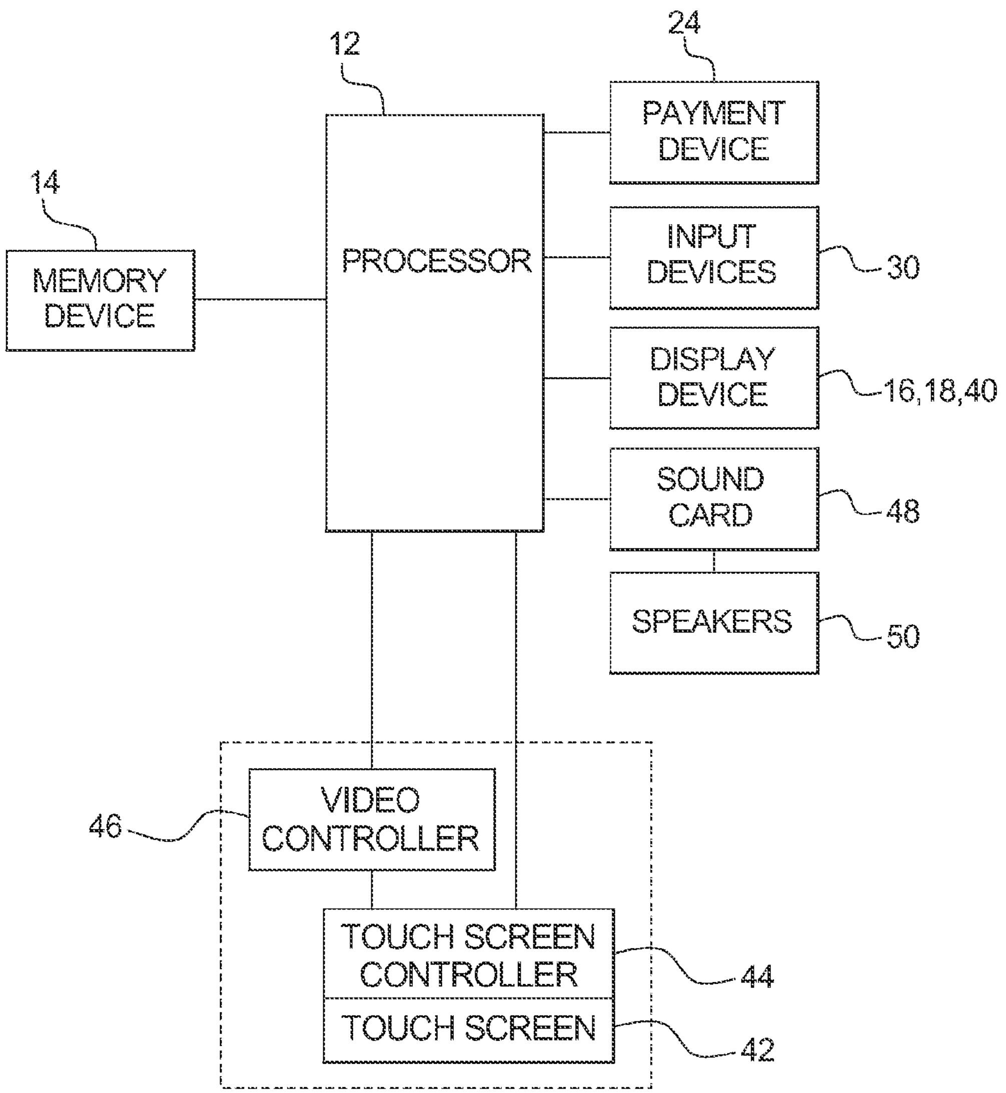
FIG. 2A is a schematic block diagram of one embodiment of an electronic configuration for one of the gaming devices disclosed herein.

In one embodiment, as illustrated in FIG. 2A, the gaming device includes at least one processor 12, such as a microprocessor, a microcontroller-based platform, a suitable integrated circuit, or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, paytable data or information, and applicable game rules that relate to the play of the gaming device. In one embodiment, the memory device includes random access memory (RAM), which may include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above may be stored in a detachable or removable memory device, such as, but not limited to, a suitable cartridge, disk, CD ROM, DVD, or USB memory device. In other embodiments, part or all of the program code and/or operating data described above may be downloaded to the memory device through a suitable network.

In one embodiment, an operator or a player may use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, such as part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 that displays the game providing multi-component symbols and awards based on common components. This display device may also display any suitable secondary or bonus game associated with the game providing multi-component symbols and awards based on common components as well as information relating to the game providing multi-component symbols and awards based on common components or the secondary or bonus game. The alternative embodiment shown in FIG. 1B includes a central display device 16 and an upper display device 18. The upper display device may display the game providing multi-component symbols and awards based on common components, any suitable secondary or bonus game associated or not associated with the game providing multi-component symbols and awards based on common components, and/or information relating to the game providing multi-component symbols and awards based on common components or the secondary or bonus game. These display devices may also serve as digital glass operable to advertise games or other aspects of the gaming establishment. As shown in FIGS. 1A and 1B, in one embodiment, the gaming device includes a credit display 20 that displays a player's current number of credits, cash, account balance, or the equivalent. In one embodiment, the gaming device includes a bet display 22 that displays a player's amount wagered. In one embodiment, as discussed in more detail below, the gaming device includes a player tracking display 40 that displays information regarding a player's play tracking status.

In another embodiment, at least one display device may be a mobile display device, such as a PDA or tablet PC, that enables play of at least a portion of the game providing multi-component symbols and awards based on common components or the secondary or bonus game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as discussed in more detail below, the display device includes a touch-screen with an associated touch-screen controller. The display devices may be of any suitable size and configuration, such as a square, a rectangle, or an elongated rectangle.

The display devices of the gaming device are configured to display at least one and preferably a plurality of game or other suitable images, symbols, and indicia such as any visual representation or exhibition of the movement of objects such as mechanical, virtual, or video reels and wheels; dynamic lighting; video images; images of people, characters, places, things, or faces of cards; and the like.

In one alternative embodiment, the symbols, images, and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As shown in FIGS. 1A and 1B, a payment device such as a payment acceptor includes a note, ticket, or bill acceptor 28, into which the player inserts paper money, a ticket, or voucher and a coin slot 26 into which the player inserts money, coins, or tokens. In other embodiments, payment devices such as readers or validators for credit cards, debit cards, or credit slips may accept payment. In one embodiment, a player may insert an identification card into a card reader of the gaming device. In one embodiment, the identification card is a smart card having a programmed microchip, a coded magnetic strip, or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, that communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as discussed above.

As shown in FIGS. 1A, 1B, and 2A, in one embodiment the gaming device includes at least one and preferably a plurality of input devices 30 in communication with the processor. The input devices may include any suitable device that enables the player to produce an input signal that is received by the processor. In one embodiment, after appropriate funding of the gaming device, the input device is a game activation device, such as a play button 32 or a pull arm (not shown) that is used by the player to start the game providing multi-component symbols and awards based on common components or sequence of events in the gaming device. The play button may be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player may increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) that enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as shown in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player may make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as shown in FIG. 2A, the gaming device includes a sound generating device controlled by one or more sound cards 48 that function in conjunction with the processor. In one embodiment, the sound generating device includes at least one and preferably a plurality of speakers 50 or other sound generating hardware and/or software for generating sounds, such as by playing music for the game providing multi-component symbols and awards based on common components and/or the secondary or bonus game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video)

images and may be configured to acquire the images in an analog, digital, or other suitable format. The display devices may be configured to display the image acquired by the camera and to display the visible manifestation of the game in split screen or picture-in-picture fashion. For example, the camera may acquire an image of the player and the processor may incorporate that image into the game providing multi-component symbols and awards based on common components and/or the secondary or bonus game as a game image, symbol, or indicia.

Gaming device 10 incorporates the game providing multi-component symbols and awards based on common components as the primary or base game. It should be appreciated that in certain other embodiments the game providing multi-component symbols and awards based on common components is a secondary or bonus game. The gaming machine or device may include some or all of the features of conventional gaming machines or devices. The gaming device may incorporate any suitable reel-type game, card game, cascading or falling symbol game, number game, or other game of chance susceptible to representation in an electronic or electromechanical form as a secondary or bonus game or feature, which in one embodiment produces a random outcome based on probability data at the time of or after placement of a wager. That is, different secondary or bonus games, such as video poker games, video blackjack games, video keno, video bingo, game may be implemented.

In one embodiment, the game providing multi-component symbols and awards based on common components includes and/or the secondary or bonus game includes one or more paylines associated with a plurality of symbol display positions. The paylines may be horizontal, vertical, circular, diagonal, angled, or any combination thereof. In this embodiment, the gaming device includes at least one and preferably a plurality of reels, such as three to five reels, in either electromechanical form with mechanical rotating reels or video form with simulated reels and movement thereof. In one embodiment, an electromechanical slot machine includes a plurality of adjacent, rotatable reels that may be combined and operably coupled with an electronic display of any suitable type. In another embodiment, if the reels are in video form, one or more of the display devices, as discussed above, displays the plurality of simulated video reels. Each reel displays a plurality of indicia or symbols, such as bells, hearts, fruits, numbers, letters, bars, or other images that preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels stop spinning if specified types and/or configurations of indicia or symbols occur on an active payline or otherwise occur in a winning pattern, occur on the requisite number of adjacent reels, and/or occur in a scatter pay arrangement.

In an alternative embodiment, rather than determining any outcome to provide to the player by analyzing the symbols generated on any wagered upon paylines as discussed above, the gaming device determines any outcome to provide to the player based on the number of associated symbols that are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if a reel is activated based on the player's wager, then each of the symbol positions of that reel will be activated and each of the active symbol positions will be part of one or more of the ways to win. In one embodiment, if a reel is not activated based on the player's wager, then a designated number of default symbol positions, such as a single symbol position of the middle row of the reel, will be activated and the default symbol position(s) will be part of one or more of the ways to win. This type of gaming machine enables a player to wager on one, more than one, or all of the reels, and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as discussed above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as discussed above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols that form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as discussed above for each of the remaining classified strings of related symbols that were previously classified or formed from related symbols on the first and second reels.

After analyzing each of the remaining strings of related symbols, the gaming device determines, for each remaining pending or incomplete string of related symbols, if any of the symbols from the next adjacent reel should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, the secondary or bonus game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table that utilizes conventional poker hand rankings to determine the winning hands. The gaming device provides the player with an award based on a winning hand and the number of credits the player wagered.

In another embodiment, the secondary or bonus game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, the secondary or bonus game may be a keno game wherein the gaming device displays a plurality of selectable indicia or numbers on at least one of the display devices. In this embodiment, the player selects at least one of a plurality of the selectable indicia or numbers via an input device such as a touch screen. The gaming device then displays a series of drawn numbers and determines an amount of matches, if any, between the player's selected numbers and the gaming device's drawn numbers. The player is provided an award based on the amount of matches, if any, based on the amount of determined matches and the number of numbers drawn.

In one embodiment, as noted above, in addition to winning credits or other awards in the game providing multi-component symbols and awards based on common components, the gaming device may also give players the opportunity to win credits in a secondary or bonus game or in a secondary or bonus round. The secondary or bonus game enables the player to obtain a prize or payout in addition to the prize or payout, if any, obtained from the game providing multi-component symbols and awards based on common components.

In general, a secondary or bonus game produces a significantly higher level of player excitement than the game providing multi-component symbols and awards based on common components because it provides a greater expectation of winning than the game providing multi-component symbols and awards based on common components, and is accompanied with more attractive or unusual features than the game providing multi-component symbols and awards based on common components. In one embodiment, the secondary or bonus game may be any type of suitable game, either similar to or completely different from the game providing multi-component symbols and awards based on common components.

In one embodiment, the triggering event or qualifying condition may be a selected outcome in the game providing multi-component symbols and awards based on common components or a particular arrangement of one or more indicia on a display device in the game providing multi-component symbols and awards based on common components, such as a BONUS symbol appearing on three adjacent reels along a payline in the game providing multi-component symbols and awards based on common components. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary or bonus games. In one such embodiment, the gaming device does not provide any apparent reason to the player for qualifying to play a secondary or bonus game. In this embodiment, qualifying for a secondary or bonus game is not triggered by an event in or based specifically on any of the plays of the game providing multi-component symbols and awards based on common components. That is, the gaming device may simply qualify a player to play a secondary or bonus game without any explanation or alternatively with simple explanations. In another embodiment, the gaming device (or central server) qualifies a player for a secondary or bonus game at least partially based on a game triggered or symbol triggered event, such as at least partially based on the play of the game providing multi-component symbols and awards based on common components.

In one embodiment, the gaming device includes a program that will automatically begin a secondary or bonus round after the player has achieved a triggering event or qualifying condition in the game providing multi-component symbols and awards based on common components. In another embodiment, after a player has qualified for a secondary or bonus game, the player may subsequently enhance his/her secondary or bonus game participation through continued play on the game providing multi-component symbols and awards based on common components. Thus, for each secondary or bonus qualifying event, such as a bonus symbol, that the player obtains, a given number of secondary or bonus game wagering points or credits may be accumulated in a “bonus meter” programmed to accrue the secondary or bonus wagering credits or entries toward eventual participation in a secondary or bonus game. The occurrence of multiple such secondary or bonus qualifying events in the game providing multi-component symbols and awards based on common components may result in an arithmetic or exponential increase in the number of secondary or bonus wagering credits awarded. In one embodiment, the player may redeem extra secondary or bonus wagering credits during the secondary or bonus game to extend play of the secondary or bonus game.

In one embodiment, no separate entry fee or buy-in for a secondary or bonus game is needed. That is, a player may not purchase entry into a secondary or bonus game; rather, the player must win or earn entry through play of the game providing multi-component symbols and awards based on common components, thus encouraging play of the game providing multi-component symbols and awards based on common components. In another embodiment, qualification of the secondary or bonus game is accomplished through a simple “buy-in” by the player—for example, if the player has been unsuccessful at qualifying through other specified activities. In another embodiment, the player must make a separate side-wager on the secondary or bonus game or wager a designated amount in the game providing multi-component symbols and awards based on common components to qualify for the secondary or bonus game. In this embodiment, the secondary or bonus game triggering event must occur and the side-wager (or designated game providing multi-component symbols and awards based on common components wager amount) must have been placed to trigger the secondary or bonus game.

Figure 2B:
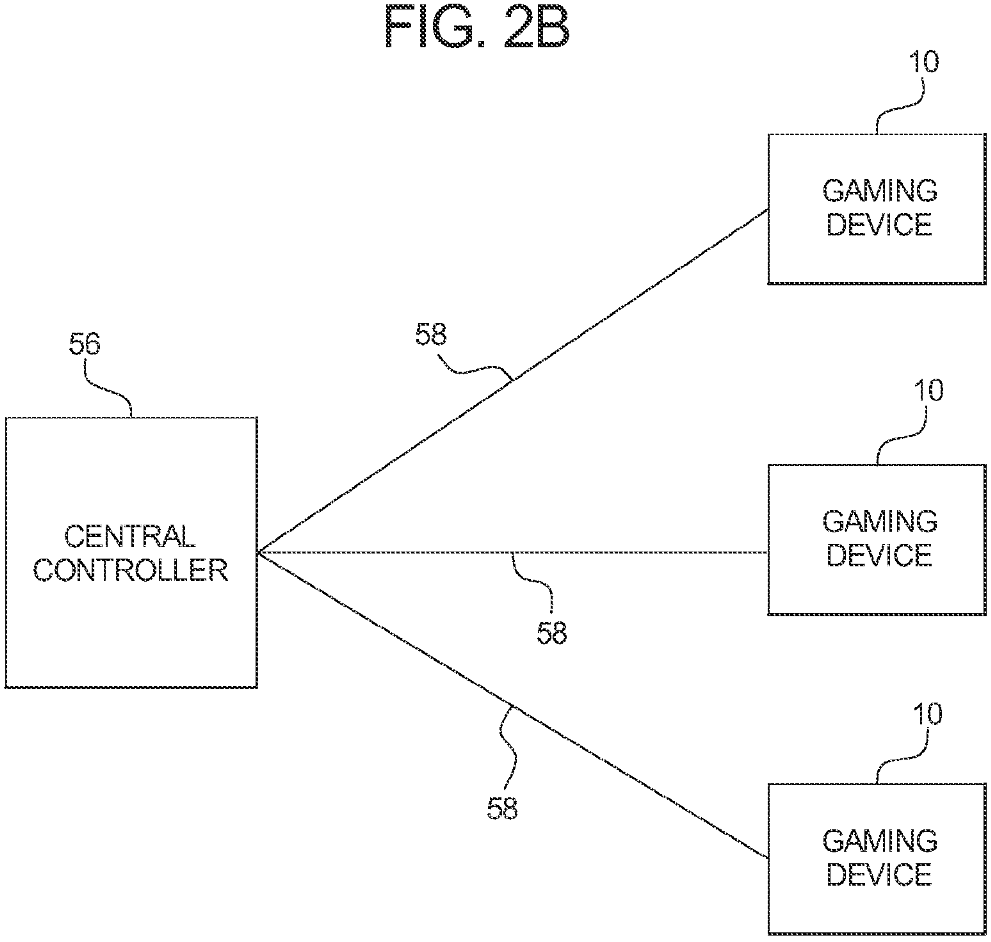
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller, or remote host is any suitable server or computing device that includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more, or each of the functions of the central controller, central server, or remote host as disclosed herein may be performed by one or more gaming device processors. It should be further appreciated that one, more, or each of the functions of one or more gaming device processors as disclosed herein may be performed by the central controller, central server, or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the game providing multi-component symbols and awards based on common components based on probability data. In another embodiment, the central server or controller randomly generates a game outcome for the secondary or bonus game based on probability data. In another embodiment, the central server or controller randomly generates a game outcome for both the game providing multi-component symbols and awards based on common components and the secondary or bonus game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome may include a game providing multi-component symbols and awards based on common components outcome, a secondary or bonus game outcome, game providing multi-component symbols and awards based on common components and secondary or bonus game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control may assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the game providing multi-component symbols and awards based on common components or the secondary or bonus game.

In the various bingo embodiments, as each gaming device is enrolled in the bingo game, such as upon an appropriate wager or engaging an input device, the enrolled gaming device is provided or associated with a different bingo card. Each bingo card includes of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination may be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As discussed above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10, which will be provided to a first player regardless of how the first player plays in a first game, and a second gaming device to have selected elements marked in a different predetermined pattern is provided a second outcome of win $2, which will be provided to a second player regardless of how the second player plays a second game. It should be appreciated that as the process of marking selected elements continues until one or more predetermined patterns are marked, this embodiment ensures that at least one bingo card will win the bingo game, and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as discussed above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as discussed above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card that has an encoded player identification number that uniquely identifies the player. When a player inserts the player's playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes the player's player tracking card when concluding play for that gaming session. In another embodiment, rather than requiring a player to insert a player tracking card, the gaming device utilizes one or more portable devices carried by a player, such as a cell phone, a radio frequency identification tag, or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) that are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device may be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as discussed above, one or more gaming devices are in communication with a central server or controller. The central server or controller may be any suitable server or computing device that includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game that may be played on one or more of the gaming devices in the gaming system. Such different games may include the same or substantially the same game play with different pay tables. In different embodiments, the executable game program is for the game providing multi-component symbols and awards based on common components, a secondary or bonus game, or both. In another embodiment, the game program may be executable as a secondary or bonus game to be played simultaneous with the play of the game providing multi-component symbols and awards based on common components (that may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate the game providing multi-component symbols and awards based on common components may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of the game providing multi-component symbols and awards based on common components. That is, a player is provided a progressive award without any explanation or, alternatively, with simple explanations. In another embodiment, a player is provided a progressive award at least partially based on a game triggered or symbol triggered event, such as at least partially based on the play of the game providing multi-component symbols and awards based on common components.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager any credit amount during the game providing multi-component symbols and awards based on common components (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the game providing multi-component symbols and awards based on common components of the gaming machines in the gaming system, via a gaming establishment or via any suitable manner.

In another embodiment, one or more of the progressive awards are partially funded via a side-bet or side-wager that the player may make (and that may be tracked via a side-bet meter). In one embodiment, one or more of the progressive awards are funded with only side-bets or side-wagers placed. In another embodiment, one or more of the progressive awards are funded based on players' wagers as discussed above as well as any side-bets or side-wagers placed.

In one alternative embodiment, a minimum wager level is required for a gaming device to qualify to be selected to obtain one of the progressive awards. In one embodiment, this minimum wager level is the maximum wager level for the game providing multi-component symbols and awards based on common components in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, among the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Game with Multi-Component Symbols and Awards Based on Common Components

Figure 3:
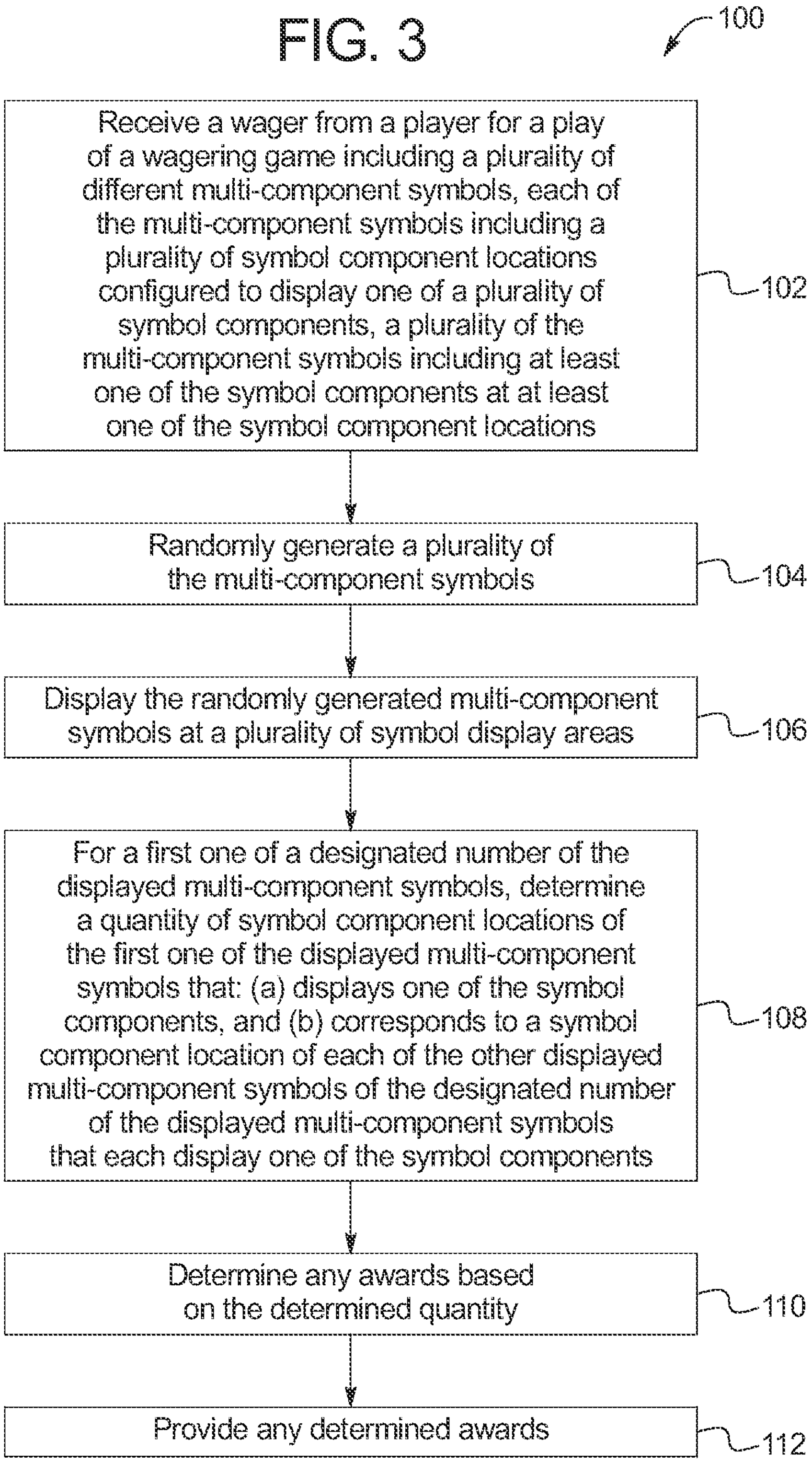
FIG. 3 is a flow chart an example process for operating one embodiment of a gaming system or gaming device providing the game with multi-component symbols and awards based on common components disclosed herein.
Figure 4:
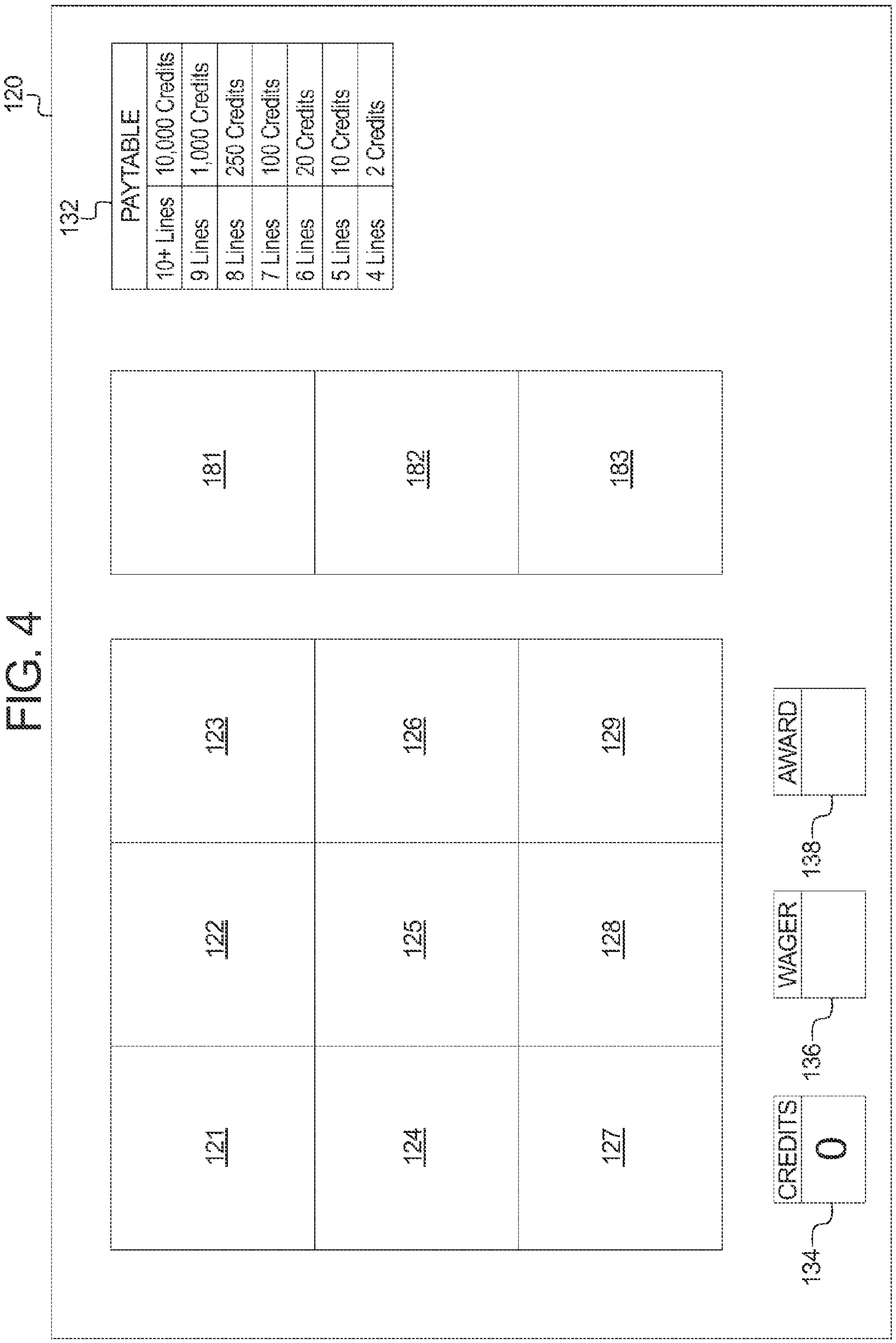
FIGS. 4, 5, 6A, 6B, 7A, 7B, 8A, 8B, and 9 are front views of a display device of an example embodiment of a gaming system or gaming device of the present disclosure and illustrate an example play of one embodiment of the game with multi-component symbols and awards based on common components disclosed herein.

FIG. 3 illustrates a flowchart of one example embodiment of a process or method 100 for operating a gaming system or a gaming device. In one embodiment, this process 100 is embodied in one or more software programs stored in one or more memories and executed by one or more processors or controllers. Although this process 100 is described with reference to the flowchart shown in FIG. 3, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system receives a wager from a player for a play of a wagering game including a plurality of different multi-component symbols, as indicated by block 102. Each of the multi-component symbols includes a plurality of individual or separate symbol component locations configured to display at least one of a plurality of symbol components. A plurality of the multi-component symbols include at least one of the symbol components in at least one of the symbol component locations. In this embodiment, each symbol component location is configured to display or include only one of the symbol components. For example, one of the multi-component symbols in this embodiment includes only one symbol component at only one of its symbol component location. Another one of the multi-component symbols in this embodiment includes only one symbol component at each of a plurality of, but less than all of, its symbol component locations. Another one of the multi-component symbols in this embodiment includes only one symbol component at each of its symbol component locations. In another embodiment, each or a plurality of the symbol component locations of at least one of the multi-component symbols is configured to display a plurality of the symbol components. In this embodiment, one of the multi-component symbols includes a plurality of symbol components at only one of its symbol component locations. Another one of the multi-component symbols in this embodiment includes a plurality of symbol components at each of a plurality of its symbol component locations. Another one of the multi-component symbols in this embodiment includes a plurality of symbol components at each of its symbol component locations.

The gaming system randomly generates a plurality of the multi-component symbols, as indicated by block 104. The gaming system displays the randomly generated multi-component symbols at the symbol display areas, as indicated by block 106. The gaming system determines, for a first one of a designated number of the displayed multi-component symbols, a quantity of symbol component locations of the first one of the displayed multi-component symbols that: (a) display one of the symbol components, and (b) correspond to a symbol component location of each of the other displayed multi-component symbols of the designated number of the displayed multi-component symbols that each display one of the symbol components, as indicated by block 108. The gaming system determines any awards based on the determined quantity, as indicated by block 110, and provides any determined awards, as indicated by block 112.

FIGS. 4, 5, 6A, 6B, 7A, 7B, 8A, 8B, and 9 illustrate one example embodiment of the gaming system, gaming device, and method of the present disclosure. The gaming system includes a display device 120 that displays one example embodiment of the game with multi-component symbols and awards based on common components of the present disclosure. While in this embodiment the game with multi-component symbols and awards based on common components is a wagering game, it should be appreciated that in other embodiments a wager is not required to play the game with multi-component symbols and awards based on common components. It should also be appreciated that the game with multi-component symbols and awards based on common components may be a secondary or bonus game as described above. The game with multi-component symbols and awards based on common components is sometimes referred to herein as the "wagering game" or "game" for brevity.

The wagering game includes a plurality of different multi-component symbols, each of which includes a plurality of symbol component locations. Each of a plurality of the multi-component symbols includes or displays at least one of a plurality of different symbol components at at least one of the symbol component locations of that multi-component symbol. The multi-component symbols are displayable at a plurality of symbol display areas. In this embodiment, each multi-component symbol includes the same sixteen symbol component locations, as explained in detail below with respect to FIGS. 6A, 6B, 7A, 7B, 8A, and 8B. In this embodiment, the symbol components are lines having different orientations, including: a horizontal line, a vertical line, a diagonal line having an upward slope from left to right, and a diagonal line having an upward slope from right to left. In this embodiment, each symbol component location is configured to display or include only one of the symbol components.

It should be appreciated that the multi-component symbols may include any suitable quantity of symbol component locations such as, but not limited to, at least three symbol component locations, at least five symbol component locations, at least seven symbol component locations, and at least nine symbol component locations. It should also be appreciated that the symbol component locations may be of any suitable size, displayed in any suitable position within the multi-component symbol, and arranged in any suitable configuration. It should further be appreciated that certain of the multi-component symbols may include different quantities of symbol component locations and that certain of the multi-component symbols may include symbol component locations configured to display different types of symbol components. It should be appreciated that any suitable types of symbol components may be utilized. While, in this example embodiment, each symbol component location is configured to display a single symbol component, it should be appreciated that in other embodiments each or a plurality of the symbol component locations is configured to display or include a plurality of symbol components.

It should also be appreciated that the multi-component symbols may be graphically represented in any suitable manner. In one example, the multi-component symbols each represent a pie and include symbol component locations configured to display symbol components that each represent a slice (or slices) of pie. In another example, the multi-component symbols each represent a treasure map and include symbol component locations configured to display symbol components that each represent a section (or sections) of that treasure map. In another example, the multi-component symbols each represent a key ring and include symbol component locations configured to display symbol components that each represent a key (or keys). In another example, the multi-component symbols each represent a car and include symbol component locations configured to display symbol components that each represent an attribute or component (or attributes or components) of the car.

In this embodiment, display device 120 adjacently displays symbol display areas 121, 122, 123, 124, 125, 126, 127, 128, and 129 in a 3×3 grid or matrix. In this example, certain of the symbol display areas are designated as symbol display area groups (referred to herein as "groups") on which the player may place one or more wagers. Specifically, Group A is associated with symbol display areas 121, 122, and 123;

Group B is associated with symbol display areas 124, 125, and 126; and Group C is associated with symbol display areas 127, 128, and 129.

It should be appreciated that the display device may display any suitable quantity of symbol display areas in any suitable configuration. It should be appreciated that any suitable quantity, any suitable combination, and any suitable configuration of the symbol display areas may comprise a symbol display area group. For example, one symbol display area group includes each of the symbol display areas in the same column of symbol display areas. In another example, one symbol display area group includes each of the symbol display areas in the same row of symbol display areas. In another example, one symbol display area group includes each of the symbol display areas forming a diagonal across the grid or matrix of symbol display areas. In another example, one symbol display area group includes each symbol display area. It should be appreciated that the symbol display area groups may be determined in any suitable manner. In one embodiment, the symbol display area groups are randomly determined. In another embodiment, the symbol display area groups are predetermined. In some embodiments, the gaming system enables the player to choose at least one symbol display area to be included in a symbol display area group. It should be appreciated that, in certain embodiments, a single symbol display area may be included in multiple symbol display area groups.

In this example embodiment, display device 120 displays a resultant symbol display area associated with each symbol display area group. Display device 120 displays resultant symbol display area 181, which is associated with Group A (symbol display areas 121, 122, and 123); resultant symbol display area 182, which is associated with Group B (symbol display areas 124, 125, and 126); and resultant symbol display area 183, which is associated with Group C (symbol display areas 127, 128, and 129). The gaming system determines, for each symbol display area group, a resultant multi-component symbol based on the multi-component symbols displayed at the symbol display areas of that symbol display area group, and displays that resultant multi-component symbol at the resultant multi-component symbol display area associated with that symbol display area group, as described in detail below. It should be appreciated that, in some embodiments, the display device does not display or include any resultant symbol display areas. It should be appreciated that, in some embodiments, a symbol display area group is associated with more than one resultant symbol display area. It should further be appreciated that, in some embodiments, a plurality of symbol display area groups are associated with a same resultant symbol display area.

Display device 130 displays a paytable 132 that includes a plurality of winning symbol component combinations. Paytable 132 indicates the credit payout associated with each respective winning symbol component combination. In this illustrated embodiment, paytable 132 indicates the credit payout associated with each respective winning symbol component combination when a wager of 1 credit is placed by a player for a play of the wagering game. More specifically, winning symbol component combination 10+ Lines is associated with an award of 10,000 credits and is awarded when a resultant multi-component symbol includes 10 or more lines (the symbol components in this example), winning symbol component combination 9 Lines is associated with an award of 1,000 credits and is awarded when a resultant multi-component symbol includes 9 lines, winning symbol component combination 8 Lines is associated with an award of 250 credits and is awarded when a resultant multi-component symbol includes 8 lines, winning symbol component combination 7 Lines is associated with an award of 100 credits and is awarded when a resultant multi-component symbol includes 7 lines, winning symbol component combination 6 Lines is associated with an award of 20 credits and is awarded when a resultant multi-component symbol includes 6 lines, winning symbol component combination 5 Lines is associated with an award of 10 credits and is awarded when a resultant multi-component symbol includes 5 lines, and winning symbol component combination 4 Lines is associated with an award of 2 credits and is awarded when a resultant multi-component symbol includes 4 lines. It should be appreciated that any suitable paytable, including any suitable winning symbol component combination and any suitable amount of credits, may be implemented. It should further be appreciated that the paytable may be dependent upon the wager placed by the player for a play of the wagering game.

Display device 120 displays a credit indicator or display 134, which indicates the player's credit balance; a wager indicator or display 136, which indicates any wager placed by the player for a play of the wagering game; and an award indicator or display 138, which indicates any awards a player has won during a play of the wagering game. It should be appreciated that, in certain embodiments, the display device displays one or a plurality of the award indicator, the wager indicator, and the credit indicator.

When the gaming system is not being played by a player, display device 120 may display an attract screen that describes the operation of the wagering game, as generally explained below.

To begin a play of the wagering game, a player places a wager on one or more symbol display area groups. For clarity and brevity, it is assumed for the purposes of this example that a wager was placed on a single symbol display area group, though it should be appreciated that the operation of the wagering game as discussed below may be repeated for any suitable quantity of wagered-on symbol display area groups. The gaming system randomly generates and displays a plurality of the multi-component symbols at the symbol display areas. In this embodiment, the gaming system randomly generates and displays one of the multi-component symbols at each of the symbol display areas, though it should be appreciated that the gaming system may generate and display any suitable quantity of the multi-component symbols at any suitable quantity of the symbol display areas.

It should be appreciated that the multi-component symbols may be generated in any suitable manner. In various embodiments, the gaming system selects complete multi-component symbols from a predetermined set of multi-component symbols. In certain of these embodiments, the selection is: (a) unweighted (i.e., each multi-component symbol has the same probability of being selected) or (b) weighted (i.e., a plurality of the multi-component symbols have different probabilities of being selected). In various other embodiments, the gaming system selects a grouping of complete multi-component symbols from a predetermined set of possible groups of multi-component symbols. In certain embodiments, the gaming system does not include a bank or set of complete multi-component symbols from which to select. In these embodiments, each of the symbol display areas includes symbol component locations, and the gaming system generates the multi-component symbols at the symbol display areas by determining, for each symbol component location of each symbol display area, whether to display a symbol component at that symbol component location. In certain of these embodiments, the determination of whether to display a symbol component is: (a) the same for each symbol component location or (b) different for one or more of the symbol component locations. It should be appreciated that, in some embodiments, the multi-component symbols are generated so as to eliminate or substantially reduce the possibility that one or more objectionable symbols are generated and displayed. It should also be appreciated that, if an objectionable symbol is generated, in various embodiments the gaming system: (a) does not display the objectionable symbol and instead generates and displays a replacement symbol, or (b) does not display the objectionable symbol and instead generates and displays a replacement symbol that provides the same award or awards that the gaming system would have provided had the objectionable symbol been displayed.

In this embodiment, the multi-component symbols displayed at the symbol display areas of the wagered-on symbol display area group correspond to one another in the following manner. Each of the symbol component locations of each of the multi-component symbols of the wagered-on symbol display area group is associated with a different one of the symbol component locations of each of the other multi-component symbols of the wagered-on symbol display area group. For example, if a wagered-on symbol display area group is associated with three multi-component symbols, each of which includes a first and a second symbol component location: (a) the first symbol component location of a first one of the multi-component symbols, the first symbol component location of a second one of the multi-component symbols, and the first symbol component location of a third one of the multi-component symbols correspond to one another; and (b) the second symbol component location of the first one of the multi-component symbols, the second symbol component location of the second one of the multi-component symbols, and the second symbol component location of the third one of the multi-component symbols correspond to one another.

It should be appreciated that the symbol component locations may correspond to one another in any suitable manner. In one embodiment, the gaming system randomly determines which symbol component locations correspond to one another. In another embodiment, the symbol component locations that correspond to one another are predetermined. In another embodiment, certain symbol component locations correspond to multiple symbol component locations of another multi-component symbol. In certain embodiments, such as embodiments in which two of three generated and displayed multi-component symbols include relatively fewer symbol component locations, certain symbol component locations do not correspond to any other symbol component locations.

For the wagered-on symbol display area group, the gaming system uses each of the multi-component symbols generated and displayed at the symbol display areas of the wagered-on symbol display area group to determine a resultant multi-component symbol and displays the determined resultant multi-component symbol at a resultant symbol display area. In other embodiments, the gaming system uses at least one or a plurality of the multi-component symbols generated and displayed at the symbol display areas of the symbol display area group to determine the resultant multi-component symbol. The gaming system may, in one embodiment, randomly determine which displayed multi-component symbols to use to determine the resultant multi-component symbol. In another embodiment, the gaming system enables the player to choose at least one of the displayed multi-component symbols the gaming system will use to determine the resultant multi-component symbol.

In this embodiment, the gaming system determines the resultant multi-component symbol by comparing the symbol components, if any, displayed or included at corresponding symbol component locations. Specifically, the gaming system determines, for each set of corresponding symbol component locations, whether each of those symbol component locations includes a symbol component that corresponds to each of the other symbol components included in the other symbol component locations of the set of corresponding symbol component locations. If each of those symbol components (i.e., the symbol components displayed in the corresponding symbol component locations) correspond to one another, the gaming device includes or displays one or more of those symbol components at a symbol component location of the resultant multi-component symbol that corresponds to the corresponding symbol component locations. In this example embodiment, symbol components correspond to one another when they are identical. Thus, continuing with the above example, in this embodiment the gaming system determines whether: (a) the first symbol component location of the first one of the multi-component symbols, the first symbol component location of the second one of the multi-component symbols, and the first symbol component location of the third one of the multi-component symbols each display a same one of the symbol components; and (b) the second symbol component location of the first one of the multi-component symbols, the second symbol component location of the second one of the multi-component symbols, and the second symbol component location of the third one of the multi-component symbols each display a same one of the symbol components. If each of the first symbol component locations display the same one of the symbol components, a symbol component location of a resultant multi-component symbol that corresponds to the first symbol component locations will display that symbol component. Similarly, if each of the second symbol component locations display a same one of the symbol components, a symbol component location of a resultant multi-component symbol that corresponds to the second symbol component locations will display that symbol component. This process is performed for each set of symbol component locations. Thus, the resultant multi-component symbol includes the common symbol components of each of the multi-component symbols displayed at the symbol display areas of the symbol display area group.

It should be appreciated that symbol components may correspond to one another in any suitable manner. In the embodiment described above and certain of the embodiments described below, identical symbol components correspond to one another. In another embodiment, symbol components correspond to one another when they share one or more features, characteristics, or attributes. For example, in one example each symbol component includes an orientation and a color. In this embodiment, two or more symbol components correspond to one another as long as one of (or, in some embodiments, a plurality of or all of) the orientation and the color match between or among the symbol components. In another example in which the symbol components include letters, the symbol components correspond to one another when they spell out a word. In another example in which the symbol components include puzzle pieces, the symbol components correspond to one another when the puzzle pieces fit together.

Once the gaming system has determined a resultant multi-component symbol for the wagered-on symbol display area group, the gaming system makes an award determination for the wagered-on symbol display area group. In this embodiment the gaming system determines a quantity of symbol components included in the resultant multi-component symbol, compares the determined quantity to a paytable, and determines whether to provide any awards based on the comparison.

Figure 5:
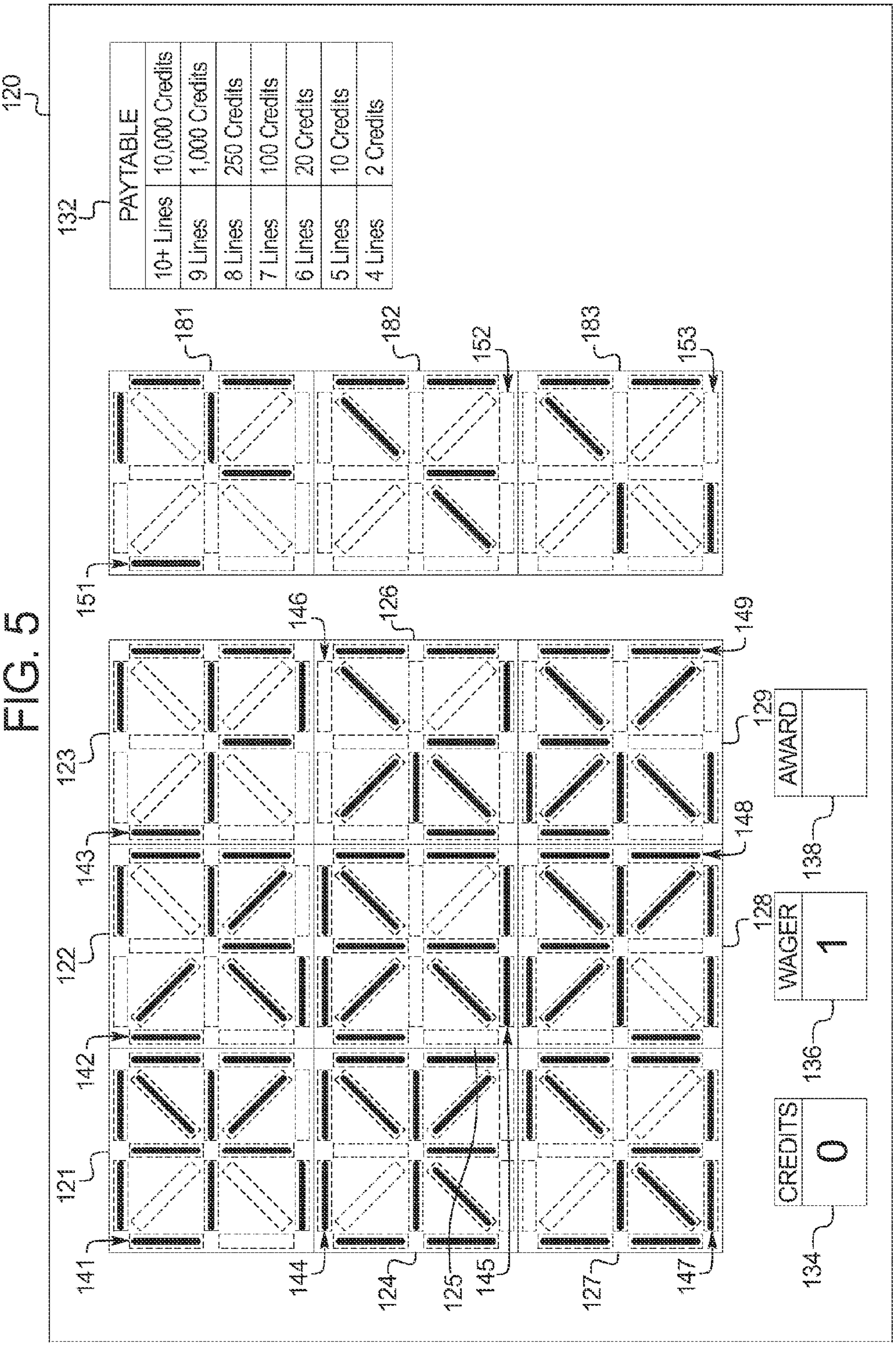

FIGS. 5, 6A, 6B, 7A, 7B, 8A, 8B, and 9 illustrate an example play of this embodiment of the wagering game. As illustrated in FIG. 5, a player begins play of the wagering game by placing a wager on one or more of Groups A, B, and C. The gaming system generates one of the multi-component symbols in each of the symbol display areas, determines a resultant multi-component symbol associated with each wagered-on symbol display area group, and displays the resultant multi-component symbol in the resultant symbol display areas. In this example the gaming system makes an award determination associated with each wagered-on symbol display area group based on the resultant multi-component symbol associated with that symbol display area group. The award determination is, therefore, based on a comparison of the symbol components of the multi-component symbols displayed at the relevant symbol display area group. Thus, in some embodiments, a resultant multi-component symbol is not displayed.

In this example, the player places a wager of 1 credit, which is applied to each of Groups A, B, and C. The player's wager of 1 credit is indicated in wager indicator 136. Credit indicator 134 displays the player's credit balance of 0 credits. Multi-component symbol 141 was generated and is displayed at symbol display area 121, multi-component symbol 142 was generated and is displayed at symbol display area 122, multi-component symbol 143 was generated and is displayed at symbol display area 123, multi-component symbol 144 was generated and is displayed at symbol display area 124, multi-component symbol 145 was generated and is displayed at symbol display area 125, multi-component symbol 146 was generated and is displayed at symbol display area 126, multi-component symbol 147 was generated and is displayed at symbol display area 127, multi-component symbol 148 was generated and is displayed at symbol display area 128, and multi-component symbol 149 was generated and is displayed at symbol display area 129. As described in detail below with respect to FIGS. 6A, 6B, 7A, 7B, 8A, and 8B, resultant multi-component symbol 151 was determined based on the symbol components of multi-component symbols 141, 142, and 143, which are displayed at the symbol display areas of Group A, and is displayed at resultant symbol display area 181; resultant multi-component symbol 152 was determined based on the symbol components of multi-component symbols 144, 145, and 146, which are displayed at the symbol display areas of Group B, and is displayed at resultant symbol display area 182; and resultant multi-component symbol 153 was determined based on the symbol components of multi-component symbols 147, 148, and 149, which are displayed at the symbol display areas of Group C, and is displayed at resultant symbol display area 183.

Figure 6A:
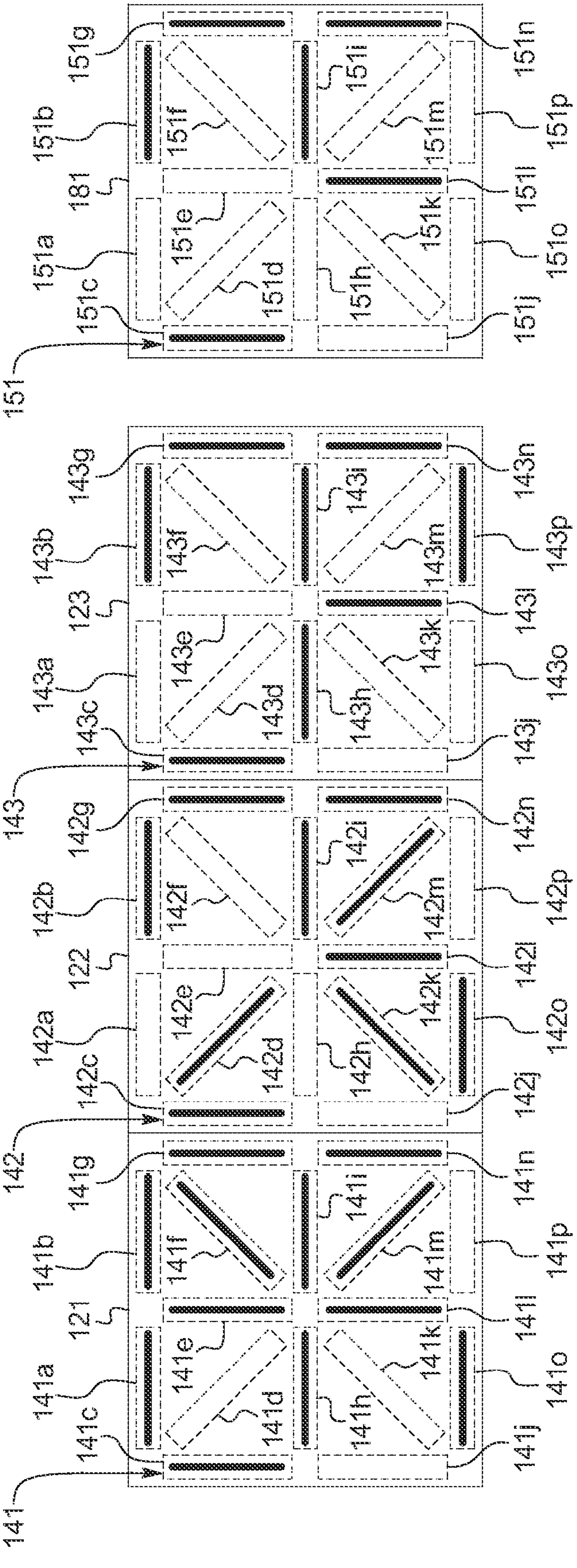
Figure 6B:
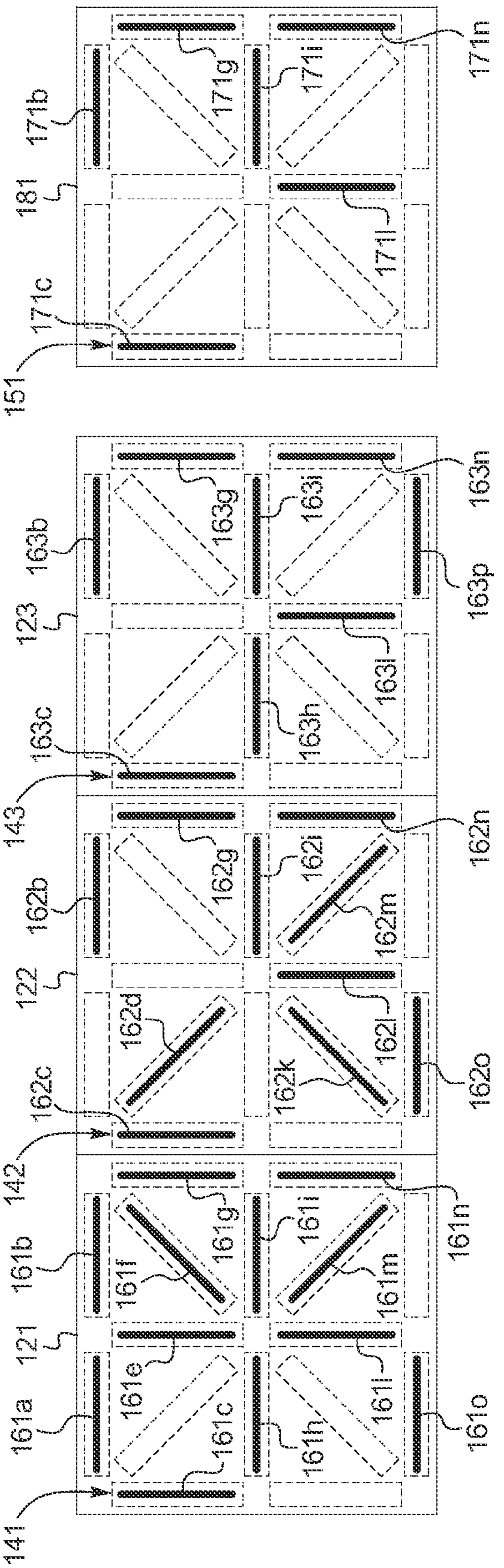

FIGS. 6A and 6B illustrate the symbol component locations and the symbol components, if any, displayed at those symbol component locations of each of multi-component symbols 141, 142, and 143 (i.e., Group A in this example), and of resultant multi-component symbol 151. Multi-component symbol 141 includes symbol component locations 141*a*, 141*b*, 141*c*, 141*d*, 141*e*, 141*f*, 141*g*, 141*h*, 141*i*, 141*j*, 141*k*, 141*l*, 141*m*, 141*n*, 141*o*, and 141*p*. Multi-component symbol 142 includes symbol component locations 142*a*, 142*b*, 142*c*, 142*d*, 142*e*, 142*f*, 142*g*, 142*h*, 142*i*, 142*j*, 142*k*, 142*l*, 142*m*, 142*n*, 142*o*, and 142*p*. Multi-component symbol 143 includes symbol component locations 143*a*, 143*b*, 143*c*, 143*d*, 143*e*, 143*f*, 143*g*, 143*h*, 143*i*, 143*j*, 143*k*, 143*l*, 143*m*, 143*n*, 143*o*, and 143*p*. Resultant multi-component symbol 151 includes symbol component locations 151*a*, 151*b*, 151*c*, 151*d*, 151*e*, 151*f*, 151*g*, 151*h*, 151*i*, 151*j*, 151*k*, 151*l*, 151*m*, 151*n*, 151*o*, and 151*p*. While, in this embodiment, the gaming system displays the symbol component locations as illustrated in FIGS. 6A and 6B, it should be appreciated that in other embodiments the symbol component locations are not displayed.

Multi-component symbol 141 includes symbol component 161*a* at symbol component location 141*a*, symbol component 161*b* at symbol component location 141*b*, symbol component 161*c* at symbol component location 141*c*, symbol component 161*e* at symbol component location 141*e*, symbol component 161*f* at symbol component location 141*f*, symbol component 161*g* at symbol component location 141*g*, symbol component 161*h* at symbol component location 141*h*, symbol component 161*i* at symbol component location 141*i*, symbol component 161*l* at symbol component location 141*l*, symbol component 161*m* at symbol component location 141*m*, symbol component 161*n* at symbol component location 141*n*, and symbol component 161*o* at symbol component location 141*o*.

Multi-component symbol 142 includes symbol component 162*b* at symbol component location 142*b*, symbol component 162*c* at symbol component location 142*c*, symbol component 162*d* at symbol component location 142*d*, symbol component 162*g* at symbol component location 142*g*, symbol component 162*i* at symbol component location 142*i*, symbol component 162*k* at symbol component location 142*k*, symbol component 162*l* at symbol component location 142*l*, symbol component 162*m* at symbol component location 142*m*, symbol component 162*n* at symbol component location 142*n*, and symbol component 162*o* at symbol component location 142*o*.

Multi-component symbol 143 includes symbol component 163*b* at symbol component location 143*b*, symbol component 163*c* at symbol component location 143*c*, symbol component 163*g* at symbol component location 143*g*, symbol component 163*h* at symbol component location 143*h*, symbol component 163*i* at symbol component location 143*i*, symbol component 163*l* at symbol component location 143*l*, symbol component 163*n* at symbol component location 143*n*, and symbol component 163*p* at symbol component location 143*p*.

In this embodiment, the gaming system determines resultant multi-component symbol 151 based on whether corresponding symbol component locations of multi-component symbols 141, 142, and 143, which are associated with Group A, each display a same one of the symbol components. That is, in this embodiment, identical symbol components correspond to one another. More specifically, if corresponding symbol component locations of multi-component symbols 141, 142, and 143 each display a same one of the symbol components, that same one of the symbol components is displayed at a symbol component location of resultant multi-component symbol 151 that corresponds to those corresponding symbol component locations of multi-component symbols 141, 142, and 143. If not, no symbol component is displayed at the corresponding symbol location of resultant multi-component symbol 151.

In this embodiment, multi-component symbols 141, 142, and 143 and resultant multi-component symbol 151 each include the same sixteen symbol component locations. In other words, each of the multi-component symbols 141, 142, and 143 and resultant multi-component symbol 151 include symbol component locations having the same size, position, and configuration. In this example, symbol component locations 141*a*, 142*a*, 143*a*, and 151*a* correspond to one another;

symbol component locations 141*b*, 142*b*, 143*b*, and 151*b* correspond to one another; symbol component locations 141*c*, 142*c*, 143*c*, and 151*c* correspond to one another; symbol component locations 141*d*, 142*d*, 143*d*, and 151*d* correspond to one another; symbol component locations 141*e*, 142*e*, 143*e*, and 151*e* correspond to one another; symbol component locations 141*f*, 142*f*, 143*f*, and 151*f* correspond to one another; symbol component locations 141*g*, 142*g*, 143*g*, and 151*g* correspond to one another; symbol component locations 141*h*, 142*h*, 143*h*, and 151*h* correspond to one another; symbol component locations 141*i*, 142*i*, 143*i*, and 151*i* correspond to one another; symbol component locations 141*j*, 142*j*, 143*j*, and 151*j* correspond to one another; symbol component locations 141*k*, 142*k*, 143*k*, and 151*k* correspond to one another; symbol component locations 141*l*, 142*l*, 143*l*, and 151*l* correspond to one another; symbol component locations 141*m*, 142*m*, 143*m*, and 151*m* correspond to one another; symbol component locations 141*n*, 142*n*, 143*n*, and 151*n* correspond to one another; symbol component locations 141*o*, 142*o*, 143*o*, and 151*o* correspond to one another; and symbol component locations 141*p*, 142*p*, 143*p*, and 151*p* correspond to one another. Put differently, the identical symbol component locations of each of displayed multi-component symbols 141, 142, 143, and 151 correspond to one another.

Corresponding symbol component locations 141*b*, 142*b*, and 143*b* each display the same one of the symbol components—a horizontal line. Thus, symbol component location 151*b* of resultant multi-component symbol 151, which corresponds to symbol component locations 141*b*, 142*b*, and 143*b*, displays symbol component 171*b*—a horizontal line. Corresponding symbol component locations 141*c*, 142*c*, and 143*c* each display the same one of the symbol components—a vertical line. Thus, symbol component location 151*c* of resultant multi-component symbol 151, which corresponds to symbol component locations 141*c*, 142*c*, and 143*c*, displays symbol component 171*c*—a vertical line. Corresponding symbol component locations 141*g*, 142*g*, and 143*g* each display the same one of the symbol components—a vertical line. Thus, symbol component location 151*g* of resultant multi-component symbol 151, which corresponds to symbol component locations 141*g*, 142*g*, and 143*g*, displays symbol component 171*g*—a vertical line. Corresponding symbol component locations 141*i*, 142*i*, and 143*i* each display the same one of the symbol components—a horizontal line. Thus, symbol component location 151*i* of resultant multi-component symbol 151, which corresponds to symbol component locations 141*i*, 142*i*, and 143*i*, displays symbol component 171*i*—a horizontal line. Corresponding symbol component locations 141*l*, 142*l*, and 143*l* each display the same one of the symbol components—a vertical line. Thus, symbol component location 151*l* of resultant multi-component symbol 151, which corresponds to symbol component locations 141*l*, 142*l*, and 143*l*, displays symbol component 171*l*—a vertical line. Corresponding symbol component locations 141*n*, 142*n*, and 143*n* each display the same one of the symbol components—a vertical line. Thus, symbol component location 151*n* of resultant multi-component symbol 151, which corresponds to symbol component locations 141*n*, 142*n*, and 143*n*, displays symbol component 171*n*—a vertical line.

Since none of the other corresponding symbol component locations of multi-component symbols 141, 142, and 143 each display the same one of the symbol components, no symbol components are generated in the remaining symbol component locations of resultant multi-component symbol 151. More specifically, symbol component location 141*a* displays symbol component 161*a*, but corresponding symbol component locations 142*a* and 143*a* do not display a symbol component; therefore, corresponding symbol component location 151*a* of resultant multi-component symbol 151 does not display a symbol component. Symbol component location 142*d* displays symbol component 162*d*, but corresponding symbol component locations 141*d* and 143*d* do not display a symbol component; therefore, corresponding symbol component location 151*d* of resultant multi-component symbol 151 does not display a symbol component. Symbol component location 141*e* displays symbol component 161*e*, but corresponding symbol component locations 142*e* and 143*e* do not display a symbol component; therefore, corresponding symbol component location 151*e* of resultant multi-component symbol 151 does not display a symbol component. Symbol component location 141*f* displays symbol component 161*f*, but corresponding symbol component locations 142*f* and 143*f* do not display a symbol component; therefore, corresponding symbol component location 151*f* of resultant multi-component symbol 151 does not display a symbol component. Symbol component location 141*h* displays symbol component 161*h* and corresponding symbol component location 143*h* displays symbol component 163*h*, but corresponding symbol component location 142*h* does not display a symbol component; therefore, corresponding symbol component location 151*h* of resultant multi-component symbol 151 does not display a symbol component. None of corresponding symbol component locations 141*j*, 142*j*, or 143*j* displays a symbol component; therefore, corresponding symbol component location 151*j* of resultant multi-component symbol 151 does not display a symbol component. Symbol component location 142*k* displays symbol component 162*k*, but corresponding symbol component locations 141*k* and 143*k* do not display a symbol component; therefore, corresponding symbol component location 151*k* of resultant multi-component symbol 151 does not display a symbol component. Symbol component location 141*m* displays symbol component 161*m* and corresponding symbol component location 142*m* displays symbol component 162*m*, but corresponding symbol component location 143*m* does not display a symbol component; therefore, corresponding symbol component location 151*m* of resultant multi-component symbol 151 does not display a symbol component. Symbol component location 1410 displays symbol component 161*o* and corresponding symbol component location 142*o* displays symbol component 162*o*, but corresponding symbol component location 143*o* does not display a symbol component; therefore, corresponding symbol component location 151*o* of resultant multi-component symbol 151 does not display a symbol component. Symbol component location 143*p* displays symbol component 163*p*, but corresponding symbol component locations 141*p* and 142*p* do not display a symbol component; therefore, corresponding symbol component location 151*p* of resultant multi-component symbol 151 does not display a symbol component.

The gaming system makes an award determination for Group A based on the quantity of symbol components included in resultant multi-component symbol 151 (i.e., matching or shared components of the multi-component symbols of Group A). Here, resultant multi-component symbol 151 includes six symbol components—171*b*, 171*c*, 171*g*, 171*i*, 171*l*, and 171*n*. Based on paytable 132, the player wins an award of 20 credits for Group A for the six symbol components (lines in this example) included in resultant multi-component symbol 151.

Figure 7A:
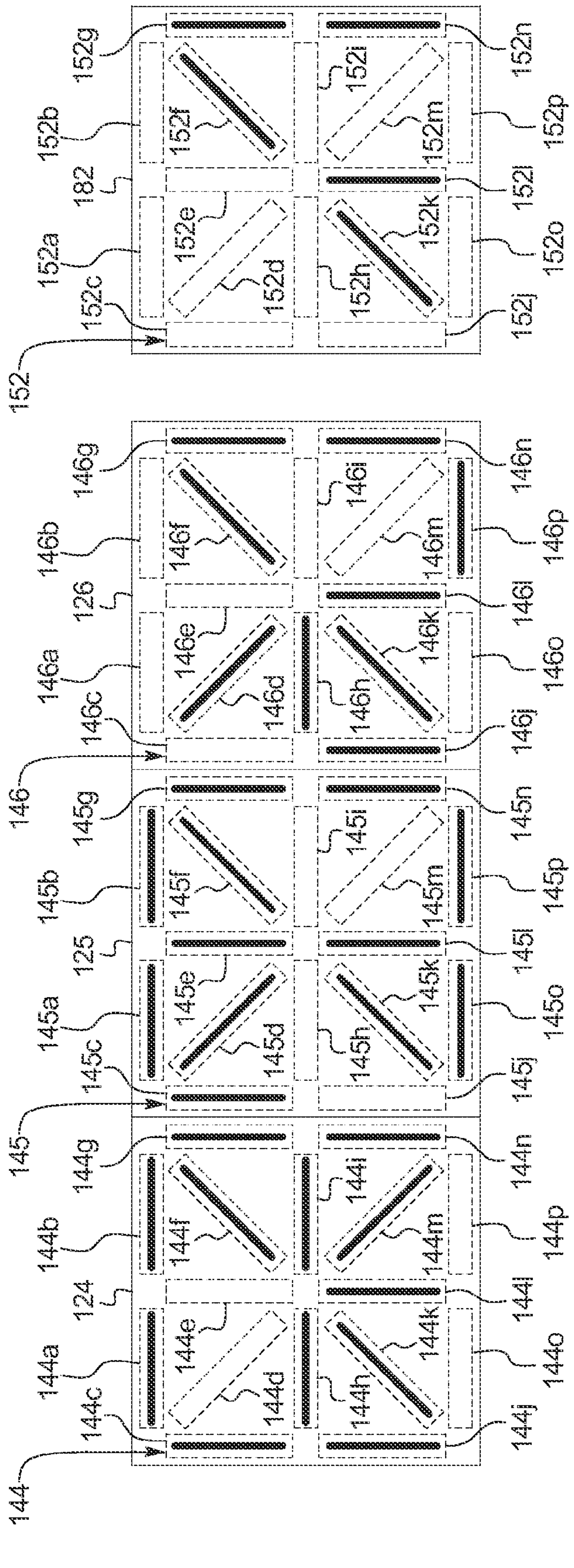
Figure 7B:
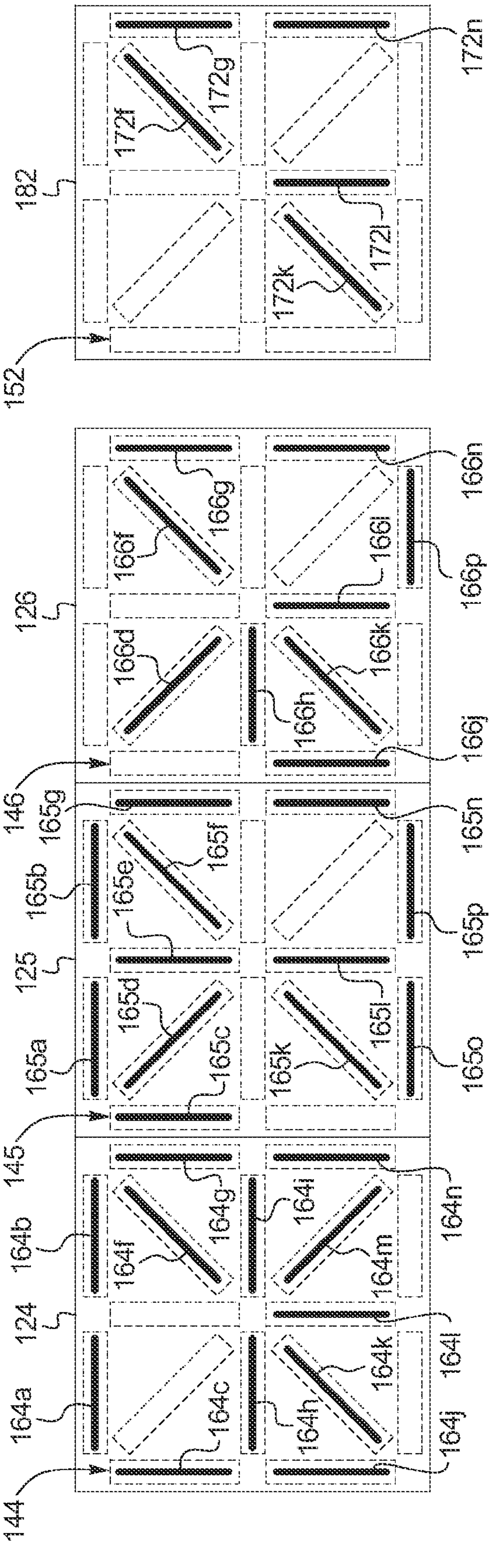

FIGS. 7A and 7B illustrate the symbol component locations and the symbol components, if any, displayed at those symbol component locations of each of multi-component symbols 144, 145, and 146 (i.e., Group B in this example), and of resultant multi-component symbol 152. Multi-component symbol 144 includes symbol component locations 144*a*, 144*b*, 144*c*, 144*d*, 144*e*, 144*f*, 144*g*, 144*h*, 144*i*, 144*j*, 144*k*, 144*l*, 144*m*, 144*n*, 144*o*, and 144*p*. Multi-component symbol 145 includes symbol component locations 145*a*, 145*b*, 145*c*, 145*d*, 145*e*, 145*f*, 145*g*, 145*h*, 145*i*, 145*j*, 145*k*, 145*l*, 145*m*, 145*n*, 145*o*, and 145*p*. Multi-component symbol 146 includes symbol component locations 146*a*, 146*b*, 146*c*, 146*d*, 146*e*, 146*f*, 146*g*, 146*h*, 146*i*, 146*j*, 146*k*, 146*l*, 146*m*, 146*n*, 146*o*, and 146*p*. Resultant multi-component symbol 152 includes symbol component locations 152*a*, 152*b*, 152*c*, 152*d*, 152*e*, 152*f*, 152*g*, 152*h*, 152*i*, 152*j*, 152*k*, 152*l*, 152*m*, 152*n*, 152*o*, and 152*p*.

Multi-component symbol 144 includes symbol component 164*a* at symbol component location 144*a*, symbol component 164*b* at symbol component location 144*b*, symbol component 164*c* at symbol component location 144*c*, symbol component 164*f* at symbol component location 144*f*, symbol component 164*g* at symbol component location 144*g*, symbol component 164*h* at symbol component location 141*h*, symbol component 164*i* at symbol component location 144*i*, symbol component 164*j* at symbol component location 144*j*, symbol component 164*k* at symbol component location 144*k*, symbol component 164*l* at symbol component location 144*l*, symbol component 164*m* at symbol component location 144*m*, and symbol component 164*n* at symbol component location 144*n*.

Multi-component symbol 145 includes symbol component 165*a* at symbol component location 145*a*, symbol component 165*b* at symbol component location 145*b*, symbol component 165*c* at symbol component location 145*c*, symbol component 165*d* at symbol component location 145*d*, symbol component 165*e* at symbol component location 145*e*, symbol component 165*f* at symbol component location 145*f*, symbol component 165*g* at symbol component location 145*g*, symbol component 165*k* at symbol component location 145*k*, symbol component 165*l* at symbol component location 145*l*, symbol component 165*n* at symbol component location 145*n*, symbol component 165*o* at symbol component location 145*o*, and symbol component 165*p* at symbol component location 145*p*.

Multi-component symbol 146 includes symbol component 166*d* at symbol component location 146*d*, symbol component 166*f* at symbol component location 146*f*, symbol component 166*g* at symbol component location 146*g*, symbol component 166*h* at symbol component location 146*h*, symbol component 166*j* at symbol component location 146*j*, symbol component 166*k* at symbol component location 146*k*, symbol component 166*l* at symbol component location 146*l*, symbol component 166*n* at symbol component location 146*n*, and symbol component 166*p* at symbol component location 146*p*.

In this embodiment, the gaming system determines resultant multi-component symbol 152 based on whether corresponding symbol component locations of multi-component symbols 144, 145, and 146, which are associated with Group B, each display a same one of the symbol components. More specifically, if corresponding symbol component locations of multi-component symbols 144, 145, and 146 each display a same one of the symbol components, that same one of the symbol components is displayed at a symbol component location of resultant multi-component symbol 152 that corresponds to those corresponding symbol component locations of multi-component symbols 144, 145, and 146. If not, no symbol component is displayed at the corresponding symbol component location of resultant multi-component symbol 152.

In this embodiment, multi-component symbols 144, 145, and 146 and resultant multi-component symbol 152 each include the same sixteen symbol component locations. In this example, symbol component locations 144*a*, 145*a*, 146*a*, and 152*a* correspond to one another; symbol component locations 144*b*, 145*b*, 146*b*, and 152*b* correspond to one another; symbol component locations 144*c*, 145*c*, 146*c*, and 152*c* correspond to one another; symbol component locations 144*d*, 145*d*, 146*d*, and 152*d* correspond to one another; symbol component locations 144*e*, 145*e*, 146*e*, and 152*e* correspond to one another; symbol component locations 144*f*, 145*f*, 146*f*, and 152*f* correspond to one another; symbol component locations 144*g*, 145*g*, 146*g*, and 152*g* correspond to one another; symbol component locations 144*h*, 145*h*, 146*h*, and 152*h* correspond to one another; symbol component locations 144*i*, 145*i*, 146*i*, and 152*i* correspond to one another; symbol component locations 144*j*, 145*j*, 146*j*, and 152*j* correspond to one another; symbol component locations 144*k*, 145*k*, 146*k*, and 152*k* correspond to one another; symbol component locations 144*l*, 145*l*, 146*l*, and 152*l* correspond to one another; symbol component locations 144*m*, 145*m*, 146*m*, and 152*m* correspond to one another; symbol component locations 144*n*, 145*n*, 146*n*, and 152*n* correspond to one another; symbol component locations 144*o*, 145*o*, 146*o*, and 152*o* correspond to one another; and symbol component locations 144*p*, 145*p*, 146*p*, and 152*p* correspond to one another. Put differently, the identical symbol component locations of each of displayed multi-component symbols 144, 145, 146, and 152 correspond to one another.

Corresponding symbol component locations 144*f*, 145*f*, and 146*f* each display the same one of the symbol components—a diagonal line having an upward slope from left to right. Thus, symbol component location 152*f* of resultant multi-component symbol 152, which corresponds to symbol component locations 144*f*, 145*f*, and 146*f*, displays symbol component 172*f*—a diagonal line having an upward slope from left to right. Corresponding symbol component locations 144*g*, 145*g*, and 146*g* each display the same one of the symbol components—a vertical line. Thus, symbol component location 152*g* of resultant multi-component symbol 152, which corresponds to symbol component locations 144*g*, 145*g*, and 146*g*, displays symbol component 172*g*—a vertical line. Corresponding symbol component locations 144*k*, 145*k*, and 146*k* each display the same one of the symbol components—a diagonal line having an upward slope from left to right. Thus, symbol component location 152*k* of resultant multi-component symbol 152, which corresponds to symbol component locations 144*k*, 145*k*, and 146*k*, displays symbol component 172*k*—a diagonal line having an upward slope from left to right. Corresponding symbol component locations 144*l*, 145*l*, and 146*l* each display the same one of the symbol components—a vertical line. Thus, symbol component location 152*l* of resultant multi-component symbol 152, which corresponds to symbol component locations 144*l*, 145*l*, and 146*l*, displays symbol component 172*l*—a vertical line. Corresponding symbol component locations 144*n*, 145*n*, and 146*n* each display the same one of the symbol components—a vertical line. Thus, symbol component location 152*n* of resultant multi-component symbol 152, which corresponds to symbol component locations 144*n*, 145*n*, and 146*n*, displays symbol component 172*n*—a vertical line.

Since none of the other corresponding symbol component locations of multi-component symbols 144, 145, and 146 each display the same one of the symbol components, no symbol components are generated in the remaining symbol component locations of resultant multi-component symbol 152. More specifically, symbol component location 144*a* displays symbol component 164*a* and corresponding symbol component location 145*a* displays symbol component 165*a*, but corresponding symbol component location 146*a* does not display a symbol component; therefore, corresponding symbol component location 152*a* of resultant multi-component symbol 152 does not display a symbol component. Symbol component location 144*b* displays symbol component 164*b* and corresponding symbol component location 145*b* displays symbol component 165*b*, but corresponding symbol component location 146*b* does not display a symbol component; therefore, corresponding symbol component location 152*b* of resultant multi-component symbol 151 does not display a symbol component. Symbol component location 144*c* displays symbol component 164 and corresponding symbol component location 145*c* displays symbol component 165*c*, but corresponding symbol component location 146*c* does not display a symbol component; therefore, corresponding symbol component location 152*c* of resultant multi-component symbol 151 does not display a symbol component. Symbol component location 145*d* displays symbol component 165*d* and corresponding symbol component location 146*d* displays symbol component 166*d*, but corresponding symbol component location 144*d* does not display a symbol component; therefore, corresponding symbol component location 152*d* of resultant multi-component symbol 152 does not display a symbol component. Symbol component location 145*e* displays symbol component 165*e*, but corresponding symbol component locations 144*e* and 146*e* do not display a symbol component; therefore, corresponding symbol component location 152*e* of resultant multi-component symbol 152 does not display a symbol component. Symbol component location 144*h* displays symbol component 164*h* and corresponding symbol component location 146*h* displays symbol component 166*h*, but corresponding symbol component location 145*h* does not display a symbol component; therefore, corresponding symbol component location 152*h* of resultant multi-component symbol 152 does not display a symbol component. Symbol component location 144*i* displays symbol component 164*i*, but corresponding symbol component locations 145*i* and 146*i* do not display a symbol component; therefore, corresponding symbol component location 152*i* of resultant multi-component symbol 151 does not display a symbol component. Symbol component location 144*j* displays symbol component 164*j* and corresponding symbol component location 146*j* displays symbol component 166*j*, but corresponding symbol component location 145*j* does not display a symbol component; therefore, corresponding symbol component location 152*j* of resultant multi-component symbol 152 does not display a symbol component. Symbol component location 144*m* displays symbol component 164*m*, but corresponding symbol component locations 145*m* and 146*m* do not display a symbol component; therefore, corresponding symbol component location 152*m* of resultant multi-component symbol 152 does not display a symbol component. Symbol component location 145*o* displays symbol component 165*o*, but corresponding symbol component locations 144*o* and 146*o* do not display a symbol component; therefore, corresponding symbol component location 152*o* of resultant multi-component symbol 152 does not display a symbol component. Symbol component location 145*p* displays symbol component 165*p* and corresponding symbol component location 146*p* displays symbol component 166*p*, but corresponding symbol component location 144*p* does not display a symbol component; therefore, corresponding symbol component location 152*p* of resultant multi-component symbol 152 does not display a symbol component.

The gaming system makes an award determination for Group B based on the quantity of symbol components included in resultant multi-component symbol 152. Here, resultant multi-component symbol 152 includes five symbol components—172*f*, 172*g*, 172*k*, 172*l*, and 172*n*. Based on paytable 132, the player wins an award of 10 credits for Group B for the five symbol components included in resultant multi-component symbol 152.

Figure 8A:
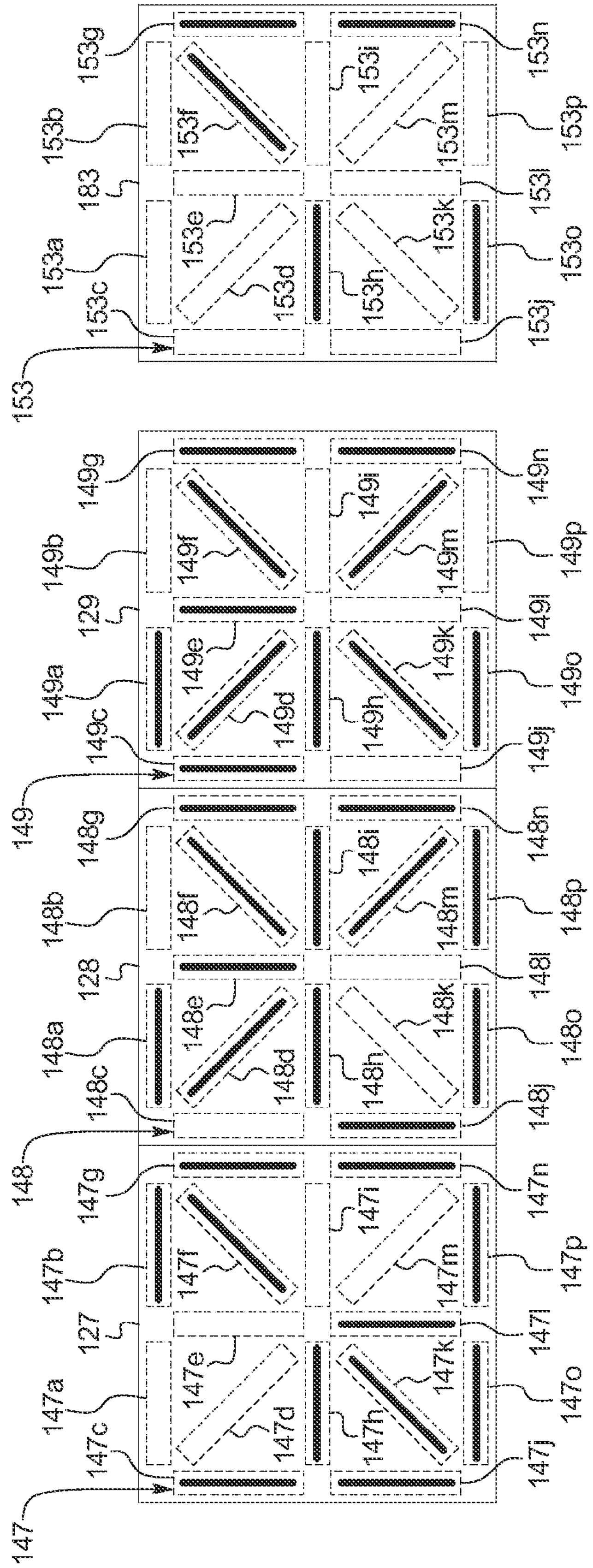
Figure 8B:
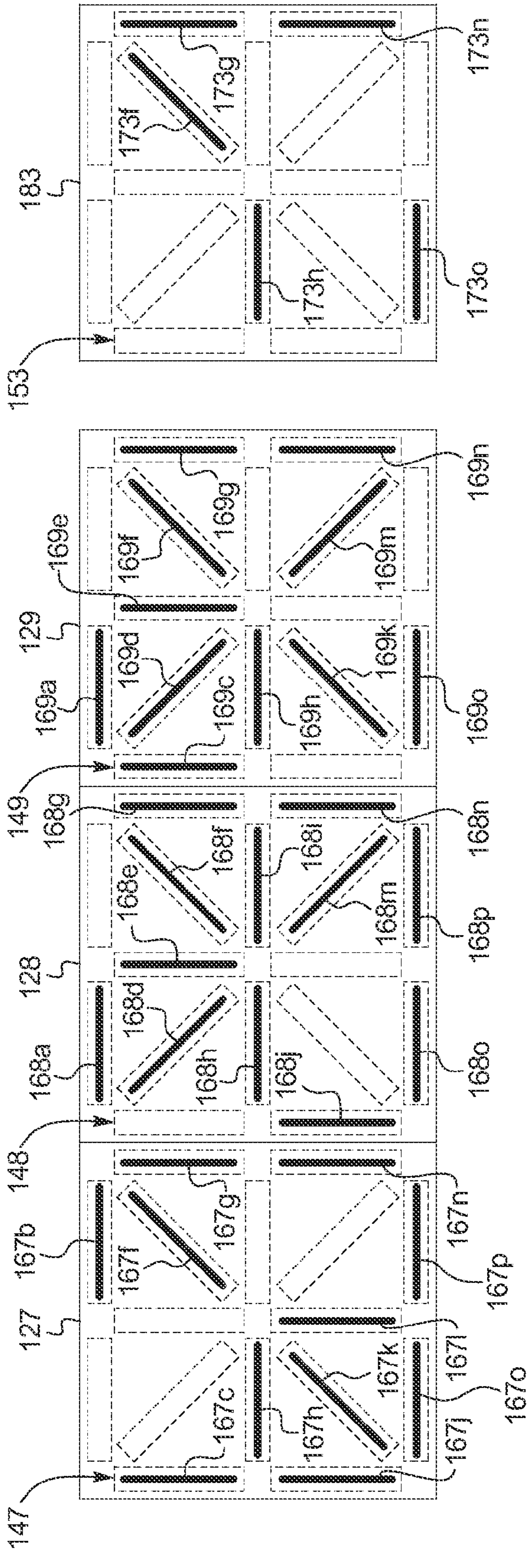

FIGS. 8A and 8B illustrate the symbol component locations and the symbol components, if any, displayed at those symbol component locations of each of multi-component symbols 147, 148, and 149 (i.e., Group C in this example), and of resultant multi-component symbol 153. Multi-component symbol 147 includes symbol component locations 147*a*, 147*b*, 147*c*, 147*d*, 147*e*, 147*f*, 147*g*, 147*h*, 147*i*, 147*j*, 147*k*, 147*l*, 147*m*, 147*n*, 147*o*, and 147*p*. Multi-component symbol 148 includes symbol component locations 148*a*, 148*b*, 148*c*, 148*d*, 148*e*, 148*f*, 148*g*, 148*h*, 148*i*, 148*j*, 148*k*, 148*l*, 148*m*, 148*n*, 148*o*, and 148*p*. Multi-component symbol 149 includes symbol component locations 149*a*, 149*b*, 149*c*, 149*d*, 149*e*, 149*f*, 149*g*, 149*h*, 149*i*, 149*j*, 149*k*, 149*l*, 149*m*, 149*n*, 149*o*, and 149*p*. Resultant multi-component symbol 153 includes symbol component locations 153*a*, 153*b*, 153*c*, 153*d*, 153*e*, 153*f*, 153*g*, 153*h*, 153*i*, 153*j*, 153*k*, 153*l*, 153*m*, 153*n*, 153*o*, and 153*p*.

Multi-component symbol 147 includes symbol component 167*b* at symbol component location 147*b*, symbol component 167*c* at symbol component location 147*c*, symbol component 167*f* at symbol component location 147*f*, symbol component 167*g* at symbol component location 147*g*, symbol component 167*h* at symbol component location 1471*h*, symbol component 167*j* at symbol component location 147*j*, symbol component 167*k* at symbol component location 147*k*, symbol component 167*l* at symbol component location 147*l*, symbol component 167*n* at symbol component location 147*n*, symbol component 167*o* at symbol component location 147*o*, and symbol component 167*p* at symbol component location 147*p*.

Multi-component symbol 148 includes symbol component 168*a* at symbol component location 148*a*, symbol component 168*d* at symbol component location 148*d*, symbol component 168*e* at symbol component location 148*e*, symbol component 168*f* at symbol component location 148*f*, symbol component 168*g* at symbol component location 148*g*, symbol component 168*h* at symbol component location 148*h*, symbol component 168*i* at symbol component location 148*i*, symbol component 168*j* at symbol component location 148*j*, symbol component 168*m* at symbol component location 148*m*, symbol component 168*n* at symbol component location 148*n*, symbol component 168*o* at symbol component location 148*o*, and symbol component 168*p* at symbol component location 148*p*.

Multi-component symbol 149 includes symbol component 169*a* at symbol component location 149*a*, symbol component 169*c* at symbol component location 149*c*, symbol component 169*d* at symbol component location 149*d*, symbol component 169*e* at symbol component location 149*e*, symbol component 169*f* at symbol component location 149*f*, symbol component 169*g* at symbol component location 149*g*, symbol component 169*h* at symbol component location 149*h*, symbol component 169*k* at symbol component location 149*k*, symbol component 169*m* at symbol component location 149*m*, symbol component 169*n* at symbol component location 149*n*, and symbol component 169*o* at symbol component location 149*o*.

In this embodiment, the gaming system determines resultant multi-component symbol 153 based on whether corresponding symbol component locations of multi-component symbols 147, 148, and 149, which are associated with Group C, each display a same one of the symbol components. More specifically, if corresponding symbol component locations of multi-component symbols 147, 148, and 149 each display a same one of the symbol components, that same one of the symbol components is displayed at a symbol component location of resultant multi-component symbol 153 that corresponds to those corresponding symbol component locations of multi-component symbols 147, 148, and 149. If not, no symbol component is displayed at the corresponding symbol component location of resultant multi-component symbol 153.

In this embodiment, multi-component symbols 147, 148, and 149 and resultant multi-component symbol 153 each include the same sixteen symbol component locations. In this example, symbol component locations 147*a*, 148*a*, 149*a*, and 153*a* correspond to one another; symbol component locations 147*b*, 148*b*, 149*b*, and 153*b* correspond to one another; symbol component locations 147*c*, 148*c*, 149*c*, and 153*c* correspond to one another; symbol component locations 147*d*, 148*d*, 149*d*, and 153*d* correspond to one another; symbol component locations 147*e*, 148*e*, 149*e*, and 153*e* correspond to one another; symbol component locations 147*f*, 148*f*, 149*f*, and 153*f* correspond to one another; symbol component locations 147*g*, 148*g*, 149*g*, and 153*g* correspond to one another; symbol component locations 147*h*, 148*h*, 149*h*, and 153*h* correspond to one another; symbol component locations 147*i*, 148*i*, 149*i*, and 153*i* correspond to one another; symbol component locations 147*j*, 148*j*, 149*j*, and 153*j* correspond to one another; symbol component locations 147*k*, 148*k*, 149*k*, and 153*k* correspond to one another; symbol component locations 147*l*, 148*l*, 149*l*, and 153*l* correspond to one another; symbol component locations 147*m*, 148*m*, 149*m*, and 153*m* correspond to one another; symbol component locations 147*n*, 148*n*, 149*n*, and 153*n* correspond to one another; symbol component locations 147*o*, 148*o*, 149*o*, and 153*o* correspond to one another; and symbol component locations 147*p*, 148*p*, 149*p*, and 153*p* correspond to one another. Put differently, the identical symbol component locations of each of displayed multi-component symbols 147, 148, 149, and 153 correspond to one another.

Corresponding symbol component locations 147*f*, 148*f*, and 149*f* each display the same one of the symbol components—a diagonal line having an upward slope from left to right. Thus, symbol component location 153*f* of resultant multi-component symbol 153, which corresponds to symbol component locations 147*f*, 148*f*, and 149*f*, displays symbol component 173*f*—a diagonal line having an upward slope from left to right. Corresponding symbol component locations 147*g*, 148*g*, and 149*g* each display the same one of the symbol components—a vertical line. Thus, symbol component location 153*g* of resultant multi-component symbol 153, which corresponds to symbol component locations 147*g*, 148*g*, and 149*g*, displays symbol component 173*g*—a vertical line. Corresponding symbol component locations 147*h*, 148*h*, and 149*h* each display the same one of the symbol components—a horizontal line. Thus, symbol component location 153*h* of resultant multi-component symbol 153, which corresponds to symbol component locations 147*h*, 148*h*, and 149*h*, displays symbol component 173*h*—a horizontal line. Corresponding symbol component locations 147*n*, 148*n*, and 149*n* each display the same one of the symbol components—a vertical line. Thus, symbol component location 153*n* of resultant multi-component symbol 153, which corresponds to symbol component locations 147*n*, 148*n*, and 149*n*, displays symbol component 173*n*—a vertical line. Corresponding symbol component locations 147*o*, 148*o*, and 1490 each display the same one of the symbol components—a horizontal line. Thus, symbol component location 153*o* of resultant multi-component symbol 153, which corresponds to symbol component locations 147*o*, 148*o*, and 149*o*, displays symbol component 173*o*—a horizontal line.

Since none of the other corresponding symbol component locations of multi-component symbols 147, 148, and 149 each display the same one of the symbol components, no symbol components are generated in the remaining symbol component locations of resultant multi-component symbol 153. Symbol component location 148*a* displays symbol component 168*a* and corresponding symbol component location 149*a* displays symbol component 169*a*, but corresponding symbol component location 147*a* does not display a symbol component; therefore, corresponding symbol component location 153*a* of resultant multi-component symbol 153 does not display a symbol component. Symbol component location 147*b* displays symbol component 167*b*, but corresponding symbol component locations 148*a* and 149*a* do not display a symbol component; therefore, corresponding symbol component location 153*b* of resultant multi-component symbol 153 does not display a symbol component. Symbol component location 147*c* displays symbol component 167*c* and corresponding symbol component location 149*c* displays symbol component 169*c*, but corresponding symbol component location 148*c* does not display a symbol component; therefore, corresponding symbol component location 153*c* of resultant multi-component symbol 153 does not display a symbol component. Symbol component location 148*d* displays symbol component 168*d* and corresponding symbol component location 149*d* displays symbol component 169*d*, but corresponding symbol component location 147*d* does not display a symbol component; therefore, corresponding symbol component location 153*d* of resultant multi-component symbol 153 does not display a symbol component. Symbol component location 148*e* displays symbol component 168*e* and corresponding symbol component location 149*e* displays symbol component 169*e*, but corresponding symbol component location 147*e* does not display a symbol component; therefore, symbol component location 153*e* of resultant multi-component symbol 153 does not display a symbol component. Symbol component location 148*i* displays symbol component 168*i*, but corresponding symbol component locations 147*i* and 149*i* do not display symbol components; therefore, symbol component location 153*i* of resultant multi-component symbol 153 does not display a symbol component. Symbol component location 147*j* displays symbol component 167*j* and corresponding symbol component location 148*j* displays symbol component 168*j*, but corresponding symbol component location 149*j* does not display a symbol component; therefore, corresponding symbol component location 153*j* of resultant multi-component symbol 153 does not display a symbol component. Symbol component location 147*k* displays symbol component 167*k* and corresponding symbol component location 149*k* displays symbol component 169*k*, but corresponding symbol component location 148*k* does not display a symbol component; therefore, corresponding symbol component location 153*k* of resultant multi-component symbol 153 does not display a symbol component. Symbol component location 147*l* displays symbol component 167*l*, but corresponding symbol component locations 148*l* and 149*l* do not display a symbol component; therefore, corresponding symbol component location 153*l* of resultant multi-component symbol 153 does not display a symbol component. Symbol component location 148*m* displays symbol component 168*m* and corresponding symbol component location 149*m* displays symbol component 169*m*, but corresponding symbol component location 147*m* does not display a symbol component; therefore, corresponding symbol component location 153*m* of resultant multi-component symbol 153 does not display a symbol component. Symbol component location 147*p* displays symbol component 167*p* and corresponding symbol component location 148*p* displays symbol component 168*p*, but corresponding symbol component location 169*p* does not display a symbol component; therefore, corresponding symbol component location 153*p* of resultant multi-component symbol 153 does not display a symbol component.

The gaming system makes an award determination for Group C based on the quantity of symbol components included in resultant multi-component symbol 153. Here, resultant multi-component symbol 153 includes five symbol components—173*f*, 173*g*, 173*h*, 173*n*, and 173*o*. Based on paytable 132, the player wins an award of 10 credits for Group C for the five symbol components included in resultant multi-component symbol 153.

Figure 9:
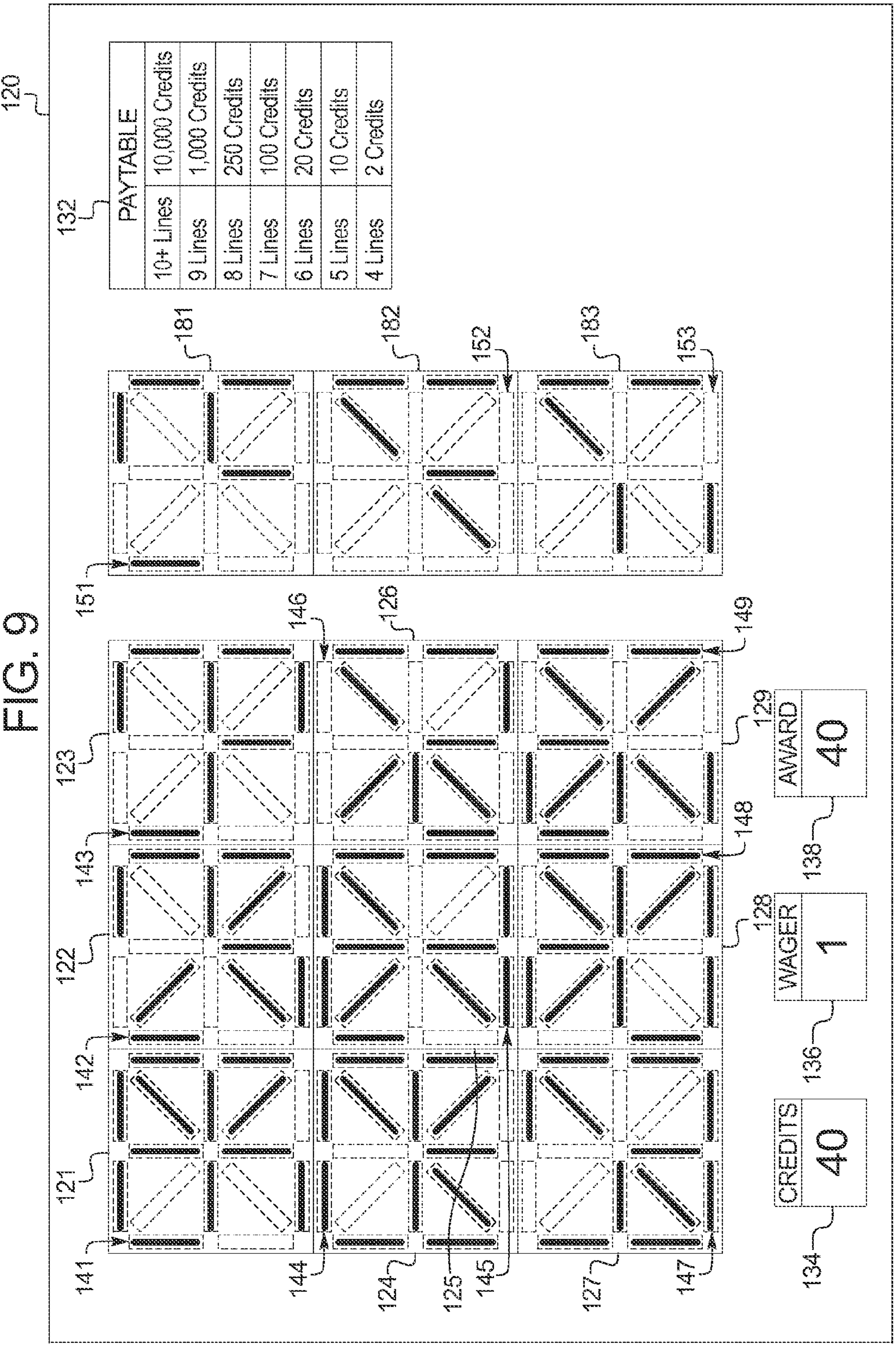

In FIG. 9, the total award of 40 credits, which includes the 20 credit award for Group A, the 10 credit award for Group B, and the 10 credit award for Group C, is displayed in award indicator 138. The player's credit balance increases from 0 credits to 40 credits, as indicated by the credit indicator 134. It should be appreciated that, in other embodiments, the gaming system makes an award determination for each, one, all, or a plurality of the displayed multi-component symbols instead of, or in addition to, any award determinations made for resultant multi-component symbols.

Figure 10:
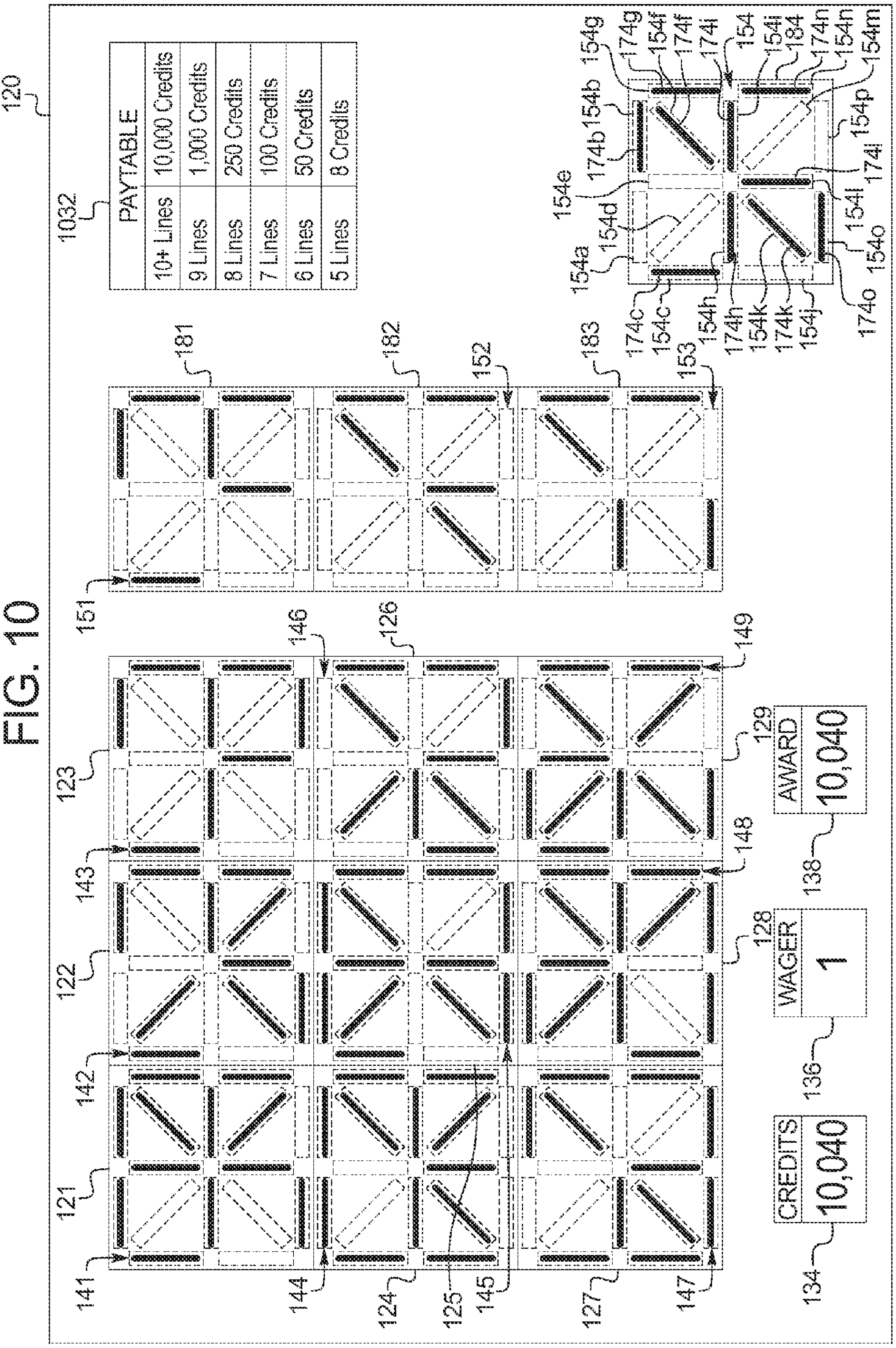
FIG. 10 is a front view of a display device of another example embodiment of a gaming system or gaming device of the present disclosure and illustrates a screen shot of another example play of the game with multi-component symbols and awards based on common components disclosed herein that includes a resultant bonus multi-component symbol.

In certain embodiments, the gaming system determines and displays a resultant bonus multi-component symbol. In some of these embodiments, the gaming system determines the resultant bonus multi-component symbol based on the symbol components of the resultant multi-component symbols. FIG. 10 illustrates an example of one of these embodiments. Display device 120 displays a resultant bonus symbol display area 184 displaying resultant bonus multi-component symbol 154, which is determined by the gaming system in the manner described below.

Resultant bonus multi-component symbol 184 includes symbol component location 154*a*; symbol component location 154*b*, which includes symbol component 174*b*; symbol component location 154*c*, which includes symbol component 174*c*; symbol component location 154*d*; symbol component location 154*e*; symbol component location 154*f*, which includes symbol component 174*f*; symbol component location 154*g*, which includes symbol component 174*g*; symbol component location 154*h*, which includes symbol component 174*h*; symbol component location 154*i*, which includes symbol component 174*i*; symbol component location 154*j*; symbol component location 154*k*, which includes symbol component 174*k*; symbol component location 154*l*, which includes symbol component 174*l*; symbol component location 154*m*; symbol component location 154*n*, which includes symbol component 174*n*; symbol component location 154*o*, which includes symbol component 174*o*; and symbol component location 154*p*.

In this embodiment, the gaming system determines which of the symbol component locations of resultant bonus multi-component symbol 154 display or include one of the symbol components based on resultant multi-component symbols 151, 152, and 153. Here, the gaming system determines resultant bonus multi-component symbol 154 based on whether symbol component locations of resultant multi-component symbols 151, 152, and 153 that correspond to symbol component locations of resultant bonus multi-component symbol 154 display one of the symbol components. More specifically, if a symbol component location of one of resultant multi-component symbols 151, 152, and 153 displays one of the symbol components, a symbol component location of resultant bonus multi-component symbol 154 that corresponds to that symbol component location (of resultant component symbol(s) 151, 152, and/or 153) will include or display the same symbol component. Put differently, resultant bonus multi-component symbol 154 is an addition of resultant multi-component symbols 151, 152, and 153. It should be appreciated that, in other embodiments, any suitable operator, such as an exclusive OR (i.e., XOR) operator, may be used to combine the resultant multi-component symbols into the resultant bonus multi-component symbol. In one embodiment utilizing the XOR operator, for example, the corresponding symbol component location of the resultant multi-component symbol will display a symbol component if only one, but not all or a plurality of, the corresponding symbol component locations of the multi-component symbols displayed in the symbol display areas of the relevant symbol display area group displays a symbol component. It should also be appreciated that any such operators may also be used to combine the displayed multi-component symbols into resultant multi-component symbols in a manner similar to that described above.

In this embodiment, resultant multi-component symbols 151, 152, and 153 and resultant bonus multi-component symbol 154 each include the same sixteen symbol component locations. In this example, symbol component locations 151*a*, 152*a*, and 153*a* each correspond to symbol component location 154*a*; symbol component locations 151*b*, 152*b*, and 153*b* each correspond to symbol component location 154*b*; symbol component locations 151*c*, 152*c*, and 153*c* each correspond to symbol component location 154*c*; symbol component locations 151*d*, 152*d*, and 153*d* each correspond to symbol component location 154*d*; symbol component locations 151*e*, 152*e*, and 153*e* each correspond to symbol component location 154*e*; symbol component locations 151*f*, 152*f*, and 153*f* each correspond to symbol component location 154*f*; symbol component locations 151*g*, 152*g*, and 153*g* each correspond to symbol component location 154*g*; symbol component locations 151*h*, 152*h*, and 153*h* each correspond to symbol component location 154*h*; symbol component locations 151*i*, 152*i*, and 153*i* each correspond to symbol component location 154*i*; symbol component locations 151*j*, 152*j*, and 153*j* each correspond to symbol component location 154*j*; symbol component locations 151*k*, 152*k*, and 153*k* each correspond to symbol component location 154*k*; symbol component locations 151*l*, 152*l*, and 153*l* each correspond to symbol component location 154*l*; symbol component locations 151*m*, 152*m*, and 153*m* each correspond to symbol component location 154*m*; symbol component locations 151*n*, 152*n*, and 153*n* each correspond to symbol component location 154*n*; symbol component locations 151*o*, 152*o*, and 153*o* each correspond to symbol component location 154*o*; and symbol component locations 151*p*, 152*p*, and 153*p* each correspond to symbol component location 154*p*.

Symbol component location 151*b* displays one of the symbol components—a horizontal line. Thus, corresponding symbol component location 154*b* of resultant bonus multi-component symbol 154 displays symbol component 174*b*—a horizontal line. Symbol component location 151*c* displays one of the symbol components—a vertical line. Thus, corresponding symbol component location 154*c* of resultant bonus multi-component symbol 154 displays symbol component 174*c*—a vertical line. Symbol component location 151*g* displays one of the symbol components—a vertical line. Thus, corresponding symbol component location 154*g* of resultant bonus multi-component symbol 154 displays symbol component 174*g*—a vertical line. Symbol component location 151*i* displays one of the symbol components—a horizontal line. Thus, corresponding symbol component location 154*i* of resultant bonus multi-component symbol 154 displays symbol component 174*i*—a horizontal line. Symbol component location 151*l* displays one of the symbol components—a vertical line. Thus, corresponding symbol component location 154*l* of resultant bonus multi-component symbol 154 displays symbol component 174*l*—a vertical line. Symbol component location 151*n* displays one of the symbol components—a vertical line. Thus, corresponding symbol component location 154*n* of resultant bonus multi-component symbol 154 displays symbol component 174*n*—a vertical line. Symbol component location 152*f* displays one of the symbol components—a diagonal line having an upward slope from left to right. Thus, corresponding symbol component location 154*f* of resultant bonus multi-component symbol 154 displays symbol component 174*f*—a diagonal line having an upward slope from left to right. Symbol component location 152*g* displays one of the symbol components—a vertical line. Corresponding symbol component location 154*g* already displays this symbol. Symbol component location 152*k* displays one of the symbol components—a diagonal line having an upward slope from left to right. Thus, corresponding symbol component location 154*k* of resultant bonus multi-component symbol 154 displays symbol component 174*k*—a diagonal line having an upward slope from left to right. Symbol component location 152*l* displays one of the symbol components—a vertical line. Corresponding symbol component location 154*l* already displays this symbol. Symbol component location 152*n* displays one of the symbol components—a vertical line. Corresponding symbol component location 154*n* already displays this symbol. Symbol component location 152*l* displays one of the symbol components—a vertical line. Corresponding symbol component location 154*l* already displays this symbol. Symbol component location 153*f* displays one of the symbol components—a diagonal line having an upward slope from left to right. Corresponding symbol component location 154*f* already displays this symbol. Symbol component location 153*g* displays one of the symbol components—a vertical line. Corresponding symbol component location 154*g* already displays this symbol. Symbol component location 153*h* displays one of the symbol components—a horizontal line. Thus, corresponding symbol component location 154*h* of resultant bonus multi-component symbol 154 displays symbol component 174*h*—a horizontal line. Symbol component location 153*n* displays one of the symbol components—a vertical line. Corresponding symbol component location 154*n* already displays this symbol. Symbol component location 153*o* displays one of the symbol components—a horizontal line. Thus, corresponding symbol component location 154*o* of resultant bonus multi-component symbol 154 displays symbol component 174*o*—a horizontal line.

Since none of corresponding symbol component locations 151*a*, 152*a*, and 153*a*; 151*d*, 152*d*, and 153*d*; 151*e*, 152*e*, and 153*e*; 151*j*, 152*j*, and 153*j*; 151*m*, 152*m*, and 153*m*, and 151*p*, 152*p*, and 153*p* display one of the symbol components, corresponding symbol component locations 154*a*, 154*d*, 154*e*, 154*j*, 154*m*, and 154*p* do not display one of the symbol components.

The gaming system makes an award determination for resultant bonus multi-component symbol 154 based on the quantity of symbol components included in resultant bonus multi-component symbol 154. Here, resultant bonus multi-component symbol 154 includes ten symbol components—174*b*, 174*c*, 174*f*, 174*g*, 174*h*, 174*i*, 174*k*, 174*l*, 174*n*, and 174*o*. Based on example paytable 1032, which is, in this embodiment, different than paytable 132 discussed above, the player wins an award of 10,000 credits for the ten symbol components included in resultant bonus multi-component symbol 154.

In certain embodiments, the gaming system determines and displays a resultant bonus multi-component symbol for each play of the wagering game. In other embodiments, the gaming system determines and displays a resultant bonus multi-component symbol upon the occurrence of a triggering event. In one embodiment, the triggering event occurs when one of the displayed multi-component symbols or one of the displayed resultant multi-component symbols includes a symbol component at each symbol component location. In another embodiment, the triggering event occurs when one of the displayed multi-component symbols or one of the displayed resultant multi-component symbols includes a designated quantity of symbol component locations that include one of the symbol components. In another embodiment, the triggering event occurs when a designated pattern of symbol components are displayed in one or more of the multi-component symbols or the resultant multi-component symbols. It should be appreciated that the designated pattern may be randomly determined, predetermined, based on game play, or selected by a player. It should be appreciated that any suitable triggering condition may be implemented.

In one embodiment, the gaming system determines the resultant bonus multi-component symbol in the same manner in which the gaming system determines the resultant multi-component symbols as described above with respect to FIGS. 4, 5, 6A, 6B, 7A, 7B, 8A, 8B, and 9. In other words, in this example, for a symbol component to be displayed at a symbol component location of the resultant bonus multi-component symbol, each symbol component location of each of the resultant multi-component symbols that corresponds to that symbol component location of the resultant bonus multi-component symbol must also display that same symbol component (i.e., those symbol components must correspond to one another).

In one embodiment, the gaming system determines an award based a quantity of symbol components in a resultant multi-component symbol that are connected to one another. More specifically, the gaming system determines the quantity of symbol components that are displayed at "connecting" (e.g., adjacent) symbol component locations.

For example, FIGS. 6A and 6B illustrate resultant multi-component symbol 151. Resultant multi-component symbol 151 includes symbol component (i.e., line, in this example) 171*c* at symbol component location 151*c*. There are no symbol component locations adjacent to symbol component location 151*c* that display a symbol component. Therefore, in this example symbol component 171*c* is not "connected" to any other displayed symbol components and is ignored for award determination purposes. Resultant multi-component symbol 151 includes symbol component 171*b* at symbol component location 151*b*. Symbol component location 151*g*, which is adjacent to symbol component location 151*b*, includes symbol component 171*g*. Thus, symbol component 171*b* and symbol component 171*g* are "connected" for the purposes of award determination. Resultant multi-component symbol 151 includes symbol component 171*i* at symbol component location 151*i*, which is adjacent to symbol component location 151*g*, which displays symbol component 171*g*. Thus, symbol component 171*g* and symbol component 171*i* are “connected” for the purposes of award determination. Since symbol component 171*b* is “connected” to symbol component 171*g*, symbol component 171*b* is also deemed “connected” to symbol component 171*i*. Using similar measures, the gaming system determines that symbol components 171*l* and 171*i* of resultant multi-component symbol 151 are also “connected” to symbol components 171*b*, 171*g*, and 171*i*. Therefore, five of the six symbol components of resultant multi-component symbol 151 are “connected,” and an award is determined based on that quantity of “connected” symbol components.

Figure 11A:
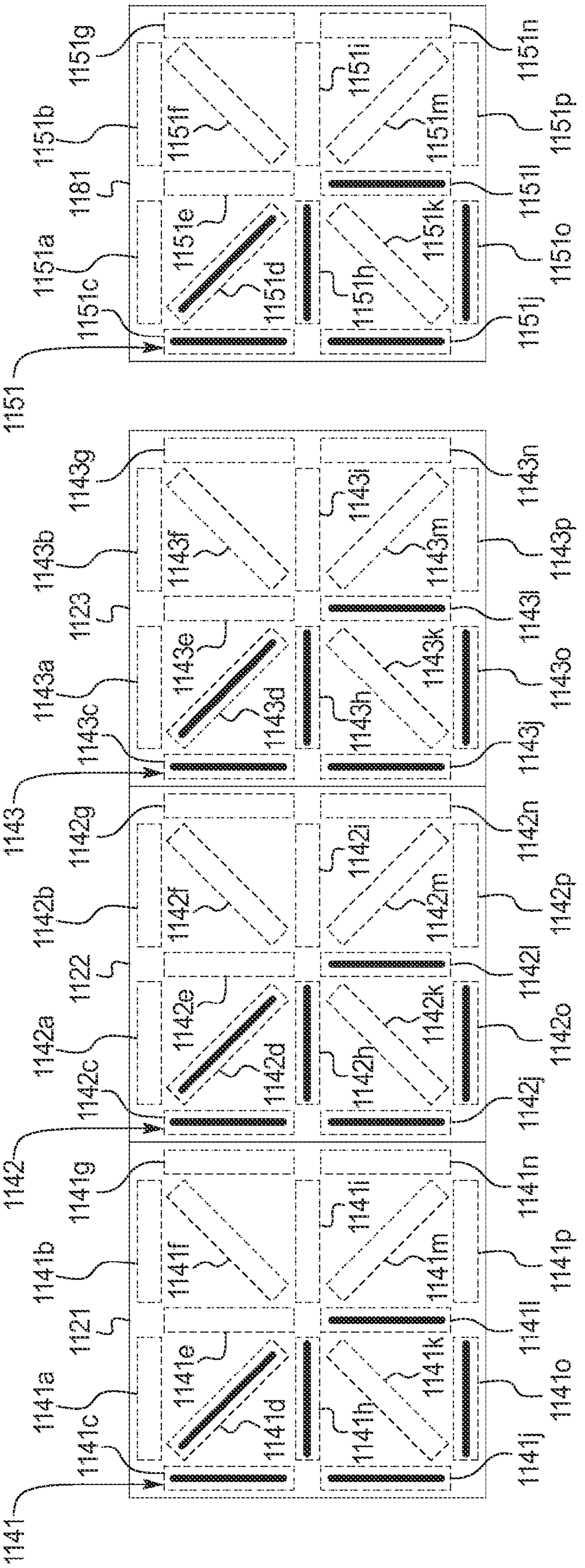
FIGS. 11A and 11B are front views of a display device of another example embodiment of a gaming system or gaming device of the present disclosure and illustrate a screen shot of another example play of the game with multi-component symbols and awards based on common components disclosed herein.
Figure 11B:
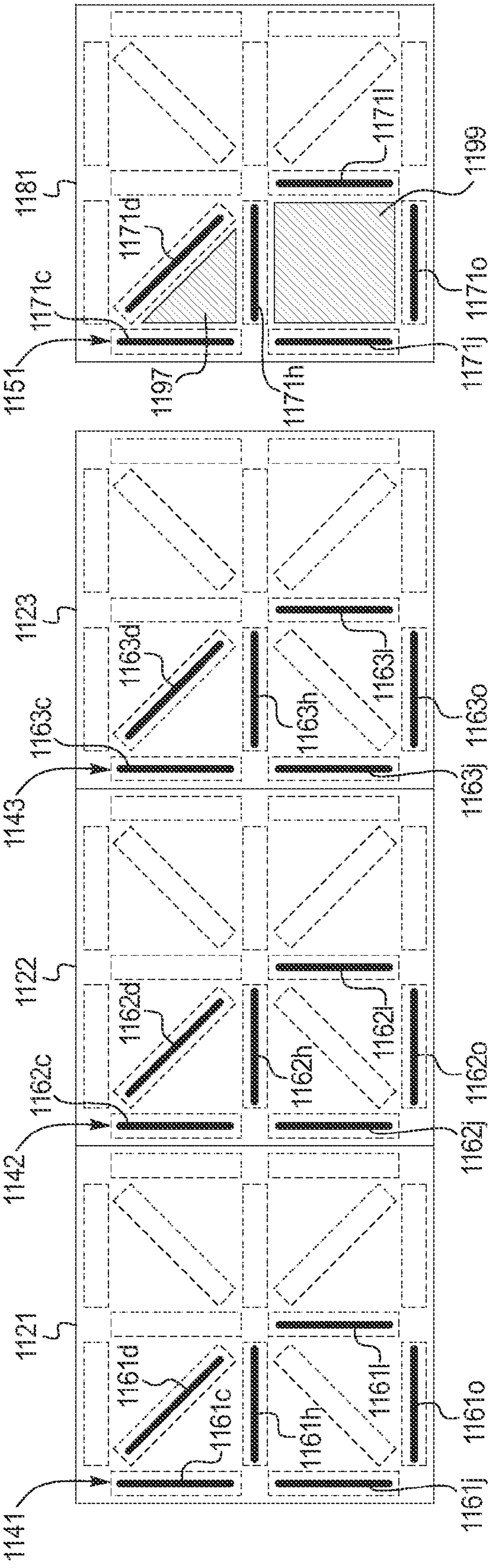

In another embodiment, the gaming system determines the award based on an amount of area of the resultant multi-component symbol that is enclosed by the symbol components included in the resultant multi-component symbol. FIGS. 11A and 11B illustrate an example of this embodiment. Specifically, FIGS. 11A and 11B illustrate the symbol component locations and the symbol components, if any, displayed at those symbol component locations of each of multi-component symbols 1141, 1142, and 1143, and of resultant multi-component symbol 1151. Multi-component symbol 1141 includes symbol component locations 1141*a*, 1141*b*, 1141*c*, 1141*d*, 1141*e*, 1141*f*, 1141*g*, 1141*h*, 1141*i*, 1141*j*, 1141*k*, 1141*l*, 1141*m*, 1141*n*, 1141*o*, and 1141*p*. Multi-component symbol 1142 includes symbol component locations 1142*a*, 1142*b*, 1142*c*, 1142*d*, 1142*e*, 1142*f*, 1142*g*, 1142*h*, 1142*i*, 1142*j*, 1142*k*, 1142*l*, 1142*m*, 1142*n*, 1142*o*, and 1142*p*. Multi-component symbol 1143 includes symbol component locations 1143*a*, 1143*b*, 1143*c*, 1143*d*, 1143*e*, 1143*f*, 1143*g*, 1143*h*, 1143*i*, 1143*j*, 1143*k*, 1143*l*, 1143*m*, 1143*n*, 1143*o*, and 1143*p*. Resultant multi-component symbol 1151 includes symbol component locations 1151*a*, 1151*b*, 1151*c*, 1151*d*, 1151*e*, 1151*f*, 1151*g*, 1151*h*, 1151*i*, 1151*j*, 1151*k*, 1151*l*, 1151*m*, 1151*n*, 1151*o*, and 1151*p*.

Multi-component symbol 1141 includes symbol component 1161*c* at symbol component location 1141*c*, symbol component 1161*d* at symbol component location 1141*d*, symbol component 1161*h* at symbol component location 1141*h*, symbol component 1161*j* at symbol component location 1141*j*, symbol component 1161*l* at symbol component location 1141*l*, and symbol component 1161*o* at symbol component location 1141*o*.

Multi-component symbol 1142 includes symbol component 1162*c* at symbol component location 1142*c*, symbol component 1162*d* at symbol component location 1142*d*, symbol component 1162*h* at symbol component location 1142*h*, symbol component 1162*j* at symbol component location 1142*j*, symbol component 1162*l* at symbol component location 1142*l*, symbol component 1162*o* at symbol component location 1142*o*.

Multi-component symbol 1143 includes symbol component 1163*c* at symbol component location 1143*c*, symbol component 1163*d* at symbol component location 1143*d*, symbol component 1163*h* at symbol component location 1143*h*, symbol component 1163*j* at symbol component location 1143*j*, symbol component 1163*l* at symbol component location 1143*l*, and symbol component 1163*o* at symbol component location 1143*o*.

In this example, the gaming system determines resultant multi-component symbol 1151 based on whether corresponding symbol component locations of multi-component symbols 1141, 1142, and 1143 each display a same one of the symbol components (i.e., whether those symbol components correspond to one another). More specifically, if corresponding symbol component locations of multi-component symbols 1141, 1142, and 1143 each display a same one of the symbol components, that same one of the symbol components is displayed at a symbol component location of resultant multi-component symbol 1151 that corresponds to those corresponding symbol component locations of multi-component symbols 1141, 1142, and 1143. If not, a symbol component is not displayed in the corresponding symbol component location of resultant multi-component symbol 1151.

In this embodiment, multi-component symbols 1141, 1142, and 1143 each include the same sixteen symbol component locations. In this example, symbol component locations 1141*a*, 1142*a*, 1143*a*, and 1151*a* correspond to one another; symbol component locations 1141*b*, 1142*b*, 1143*b*, and 1151*b* correspond to one another; symbol component locations 1141*c*, 1142*c*, 1143*c*, and 1151*c* correspond to one another; symbol component locations 1141*d*, 1142*d*, 1143*d*, and 1151*d* correspond to one another; symbol component locations 1141*e*, 1142*e*, 1143*e*, and 1151*e* correspond to one another; symbol component locations 1141*f*, 1142*f*, 1143*f*, and 1151*f* correspond to one another; symbol component locations 1141*g*, 1142*g*, 1143*g*, and 1151*g* correspond to one another; symbol component locations 1141*h*, 1142*h*, 1143*h*, and 1151*h* correspond to one another; symbol component locations 1141*i*, 1142*i*, 1143*i*, and 1151*i* correspond to one another; symbol component locations 1141*j*, 1142*j*, 1143*j*, and 1151*j* correspond to one another; symbol component locations 1141*k*, 1142*k*, 1143*k*, and 1151*k* correspond to one another; symbol component locations 1141*l*, 1142*l*, 1143*l*, and 1151*l* correspond to one another; symbol component locations 1141*m*, 1142*m*, 1143*m*, and 1151*m* correspond to one another; symbol component locations 1141*n*, 1142*n*, 1143*n*, and 1151*n* correspond to one another; symbol component locations 1141*o*, 1142*o*, 1143*o*, and 11510 correspond to one another; and symbol component locations 1141*p*, 1142*p*, 1143*p*, and 1151*p* correspond to one another. Put differently, the identical symbol component locations of each of displayed multi-component symbols 1141, 1142, 1143, and 1151 correspond to one another.

Which symbol component locations of resultant multi-component symbol 1151 display or include a symbol component is determined in the manner described above with respect to FIGS. 6A, 6B, 7A, 7B, 8A, and 8B. Specifically, corresponding symbol component locations 1141*c*, 1142*c*, and 1143*c* each display the same one of the symbol components—a vertical line. Thus, symbol component location 1151*c* of resultant multi-component symbol 1151, which corresponds to symbol component locations 1141*c*, 1142*c*, and 1143*c*, displays symbol component 1171*c*—a vertical line. Similarly, symbol component location 1151*d* displays symbol component 1171*d*, symbol component location 1151*h* displays symbol component 1171*h*, symbol component location 1151*j* displays symbol component 1171*j*, symbol component location 1151*l* displays symbol component 1171*l*, and symbol component location 1151*o* displays symbol component 1171*o*.

The gaming system makes an award determination based on an amount of area of resultant multi-component symbol 1151 that is enclosed by the symbol components included in resultant multi-component symbol 1151. For example, if symbol components 1171*a*, 1171*b*, 1171*c*, 1171*g*, 1171*j*, 1171*n*, 1171*o*, and 1171*p* (i.e., each of the outer symbol components) of resultant multi-component symbol 1151 were displayed, 100% of the area of resultant multi-component symbol 1151 would be enclosed. In this example, symbol components 1171*c*, 1171*d*, and 1171*h* enclose an area defined by triangle 1197, which comprises one-eighth (12.5%) of resultant multi-component symbol 1151. Symbol components 1171*h*, 1171*j*, 1171*l*, and 1171*o* enclose an area defined by square 1199, which comprises one-fourth (25%) of resultant multi-component symbol 1151. Thus, a total of three-eighths (37.5%) of the total area of resultant multi-component symbol 1151 is enclosed by the displayed symbol components, and an award is determined based on that percentage.

In another embodiment, the gaming system makes an award determination based on a quantity of shapes enclosed by the symbol components of the resultant multi-component symbol. In the embodiment illustrated in FIGS. 11A and 11B, for example, two shapes are enclosed by the symbol components of the resultant multi-component symbol—triangle 1197 and square 1199—and, therefore, the player may win an award for achieving two enclosed shapes. In one embodiment, the player may win an award based on the type(s) of shape(s) enclosed by the symbol components of the resultant multi-component symbols.

Figure 12:
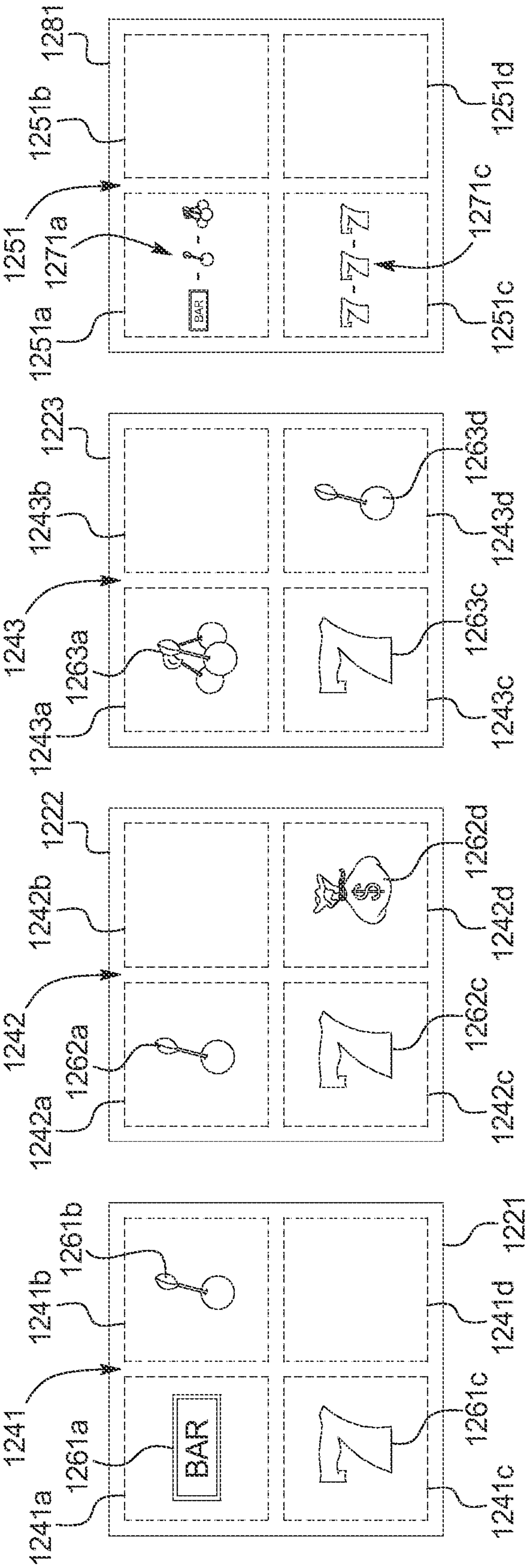
FIG. 12 is a front view of a display device of another example embodiment of a gaming system or gaming device of the present disclosure and illustrates a screen shot of another example play of the game with multi-component symbols and awards based on common components disclosed herein.

In certain embodiments, the gaming system makes an award determination that depends upon whether corresponding symbol component locations display a symbol component that is not necessarily the same symbol component. In other words, in these embodiments, the symbol components displayed at the corresponding symbol component locations do not have to be the same symbol component for the player to receive an award. FIG. 12 illustrates an example of one of these embodiments. Specifically, FIG. 12 illustrates the symbol component locations and the symbol components, if any, displayed at those symbol component locations of each of multi-component symbols 1241, 1242, and 1243, and of resultant multi-component symbol 1251. Multi-component symbol 1241 includes symbol component locations 1241*a*, 1241*b*, 1241*c*, and 1241*d*. Multi-component symbol 1242 includes symbol component locations 1242*a*, 1242*b*, 1242*c*, and 1242*d*. Multi-component symbol 1243 includes symbol component locations 1243*a*, 1243*b*, 1243*c*, and 1243*d*. Resultant multi-component symbol 1251 includes symbol component locations 1251*a*, 1251*b*, 1251*c*, and 1251*d*.

Multi-component symbol 1241 includes symbol component 1261*a* at symbol component location 1241*a*, symbol component 1262*b* at symbol component location 1241*b*, and symbol component 1261*c* at symbol component location 1241*c*. Multi-component symbol 1242 includes symbol component 1262*a* at symbol component location 1242*a*, symbol component 1262*c* at symbol component location 1242*c*, and symbol component 1262*d* at symbol component location 1242*d*. Multi-component symbol 1243 includes symbol component 1263*a* at symbol component location 1243*a*, symbol component 1263*c* at symbol component location 1243*c*, and symbol component 1263*d* at symbol component location 1243*d*.

In this example, multi-component symbols 1241, 1242, and 1243 each include the same four symbol component locations. In this example, symbol component locations 1241*a*, 1242*a*, and 1243*a* correspond to one another; symbol component locations 1241*b*, 1242*b* and 1243*b* correspond to one another; symbol component locations 1241*c*, 1242*c*, and 1243*c* correspond to one another; and symbol component locations 1241*d*, 1242*d* and 1243*d* correspond to one another. Put differently, the identical symbol component locations of each of displayed multi-component symbols 1241, 1242, and 1243 correspond to one another.

Corresponding symbol component locations 1241*a*, 1242*a*, and 1243*a* each display one of the symbol components—symbol component location 1241*a* displays BAR symbol component 1261*a*, symbol component location 1242*a* displays CHERRY symbol component 1262*a*, and symbol component location 1243*a* displays TRIPLE CHERRY symbol component 1263*a*. Corresponding symbol component locations 1241*c*, 1242*c*, and 1243*c* each display one of the symbol components—symbol component location 1241*c* displays SEVEN symbol component 1261*c*, symbol component location 1242*c* displays SEVEN symbol component 1262*c*, and symbol component location 1243*c* displays SEVEN symbol component 1263*c*.

The gaming system makes an award determination based on an quantity of sets of corresponding symbol component locations that display one of the symbol components. Here, there are four sets of corresponding symbol component locations: (1) 1241*a*, 1242*a*, and 1243*a*; (2) 1241*b*, 1242*b*, and 1243*b*; (3) 1241*c*, 1242*c*, and 1243*c*; and (4) 1241*d*, 1242*d*, and 1243*d*. Two of those sets include symbol component locations that each display one of the symbol components. Therefore, the gaming system makes an award determination based on the determined quantity of two.

In one example embodiment, also illustrated in FIG. 12, the gaming system determines resultant multi-component symbol 1251 based on whether corresponding symbol component locations of multi-component symbols 1241, 1242, and 1243 each display one of the symbol components. More specifically, if corresponding symbol component locations of multi-component symbols 1241, 1242, and 1243 each display one of the symbol components, each of those symbol components is displayed at a symbol component location of resultant multi-component symbol 1251 that corresponds to those corresponding symbol component locations of multi-component symbols 1241, 1242, and 1243. In this example, symbol component locations 1241*a*, 1242*a*, and 1243*a* correspond to symbol component location 1251*a*; symbol component locations 1241*b*, 1242*b*, and 1243*b* correspond to symbol component location 1251*b*; symbol component locations 1241*c*, 1242*c*, and 1243*c* correspond to symbol component location 1251*c*; and symbol component locations 1241*c*, 1242*c*, and 1243*c* correspond to symbol component location 1251*c*. Put differently, the identical symbol component locations of each of displayed multi-component symbols 1241, 1242, 1243, and 1251 correspond to one another.

As shown in FIG. 12, symbol component set 1271*a*, which includes symbol components 1241*a*, 1242*a*, and 1243*a*, is displayed at symbol component location 1251*a*, and symbol component set 1271*c*, which includes symbol components 1241*c*, 1242*c*, and 1243*c*, is displayed at symbol component location 1251*c*. The gaming system makes an award determination based on resultant symbol component sets 1271*a* and 1271*c*. Specifically, the gaming system compares the symbols included in the resultant symbol component sets to a paytable to determine whether to provide an award.

In certain embodiments, the gaming system makes an award determination based on whether a same one of the symbol components is displayed at any symbol component location of each corresponding multi-component symbol. FIG. 12 illustrates an example of one of these embodiments. In FIG. 12, corresponding multi-component symbols 1241, 1242, and 1243 each include a same cherry symbol component; therefore, the player may be provided an award. The fact that CHERRY symbol component 1261*b*, CHERRY symbol component 1262*a*, and CHERRY symbol component 1263*d* are not displayed at corresponding symbol component locations is irrelevant in this example embodiment.

In another embodiment, a symbol component location of a resultant multi-component symbol displays or includes a symbol component as long as one of the symbol component locations of one of the multi-component symbols that corresponds to that symbol component location of the resultant multi-component symbol displays one of the symbol components. In other words, in this embodiment, the resultant multi-component symbol is determined by adding together the symbol components of each of the multi-component symbols associated with that resultant multi-component symbol. In one of these embodiments, each of the symbol components of the displayed multi-component symbols is of a certain color. If multiple corresponding symbol component locations display symbol components having different colors, the symbol component location of the resultant multi-component symbol that corresponds to those symbol component locations displays a symbol component having a color that is the combination (e.g., addition) of those different colors. For example, if a symbol component location of a first multi-component symbol displays a red symbol component and a corresponding symbol component location of a second multi-component symbol displays a yellow symbol component, a corresponding symbol component location of a resultant multi-component symbol will display an orange symbol component (red+yellow).

In one embodiment, resultant multi-component symbols or resultant bonus multi-component symbols are determined based on the multi-component symbols displayed in a designated quantity of plays of the wagering game. For example, in this embodiment, the resultant bonus multi-component symbol may be determined based on the resultant multi-component symbols generated in three consecutive plays of the wagering game.

While the embodiment of the gaming system described above with respect to FIGS. 4, 5, 6A, 6B, 7A, 7B, 8A, 8B, and 9 determines an award for a group of symbol display areas based on the quantity of symbol components included in the corresponding resultant multi-component symbol, it should be appreciated that awards may be determined in a variety of additional or alternative manners, such as those described below.

For example, in some embodiments, awards are provided via a bingo-type game. In these embodiments, the player is initially provided with a bingo card including certain multi-component symbols. As the player plays the wagering game and achieves multi-component symbols that match the multi-component symbols on the bingo card (e.g., matching multi-component symbols, matching resultant multi-component symbols, or matching resultant bonus multi-component symbols are generated or determined, depending upon the embodiment), those matching multi-component symbols on the bingo card are marked off (e.g., daubed) by the gaming system or the player. When a certain predefined (or, in some embodiments, randomly determined) pattern of the multi-component symbols on the bingo card have been marked off or daubed, the gaming system provides a corresponding award. For example, if a grouping of multi-component symbols on the bingo card forming a T or an H shape are marked off or daubed, the gaming system provides the player with an award. In some embodiments, each bingo card is associated with a single play of the game. In these embodiments, the bingo card is reset (e.g., any marked multi-component symbols are unmarked) once that play of the game is complete. In other embodiments, each bingo card may persist for a plurality of plays of the game.

In another example, in certain embodiments, the gaming system enables the player to place one or more wagers on one or more groups or sets of corresponding symbol component locations. In these embodiments, if each of (or, in some embodiments, a plurality of) the corresponding symbol component locations of the wagered-on group of corresponding symbol component locations displays a symbol component, the gaming system provides an award to the player. In other embodiments, the gaming system enables the player to place one or more wagers on one or more specific symbol components. In these embodiments, if each of a designated number of symbol component locations display the wagered-on symbol component, the gaming system provides an award to the player.

In another example, in some embodiments, the gaming system provides a player with an award associated with a symbol display area group as long as the multi-component symbols of each pair of adjacent multi-component symbols in that group share a same quantity of symbol components. In one example, the gaming system generates four multi-component symbols in the following order from left to right: a first multi-component symbol, a second multi-component symbol, a third multi-component symbol, and a fourth multi-component symbol. The first and the second multi-component symbols, which are an adjacent pair of multi-component symbols, each include symbol components 1, 5, 6, and 7. That is, they share four symbol components. The second and the third multi-component symbols, which are an adjacent pair of multi-component symbols, each include symbol components 1, 4, and 8. That is, they share three symbol components. The third and fourth multi-component symbols, which are an adjacent pair of multi-component symbols, each include symbol components 4, 5, and 8. That is, they share three symbol components. The gaming system provides the player with any corresponding award.

In another example, in various embodiments, certain of the symbol components of a resultant multi-component symbol (or, in embodiments without resultant multi-component symbols, certain of the matching symbol components of corresponding symbol component locations of a group of multi-component symbols) are associated with higher award amounts than other of the symbol components. Generally, in these embodiments resultant multi-component symbols are associated with awards based on the relative rarity of the symbol components included in those resultant multi-component symbols. For example, in one embodiment the probability of generating a multi-component symbol including a first symbol component is lower than the probability of generating a multi-component symbol including a second symbol component. In other words, it is more likely that the generated multi-component symbols of a group of multi-component symbols will share (i.e., include corresponding symbol component locations that each display) the second symbol component than the first symbol component. That is, it is more likely that a resultant multi-component symbol will include the second symbol component than the first symbol component. In this embodiment, since the first symbol component is rarer than the second symbol component, the gaming system provides a relatively higher award when the first symbol component is generated in corresponding symbol component locations of multi-component symbols generated at a group of symbol display areas than when the second symbol component is similarly generated.

In another example, in certain embodiments, the gaming system utilizes a horseshoe-type paytable rather than the paytable described above with respect to FIGS. 4, 5, 6A, 6B, 7A, 7B, 8A, 8B, and 9. In these embodiments, the paytable includes: (a) no awards for the quantity of symbol components most likely to be included in a resultant multi-component symbol (or, in embodiments without resultant multi-component symbols, certain of the matching symbol components of corresponding symbol component locations); (b) increasing awards as the quantity of symbol components in the resultant multi-component symbol increases from those most probable quantities; and (c) increasing awards as the quantity of symbol components in the resultant multi-component symbol decreases from those most probable quantities. For example, in one embodiment, the paytable includes: (a) no award associated with a resultant multi-component symbol that includes one, two, or three symbol components; (b) increasing awards (greater than zero) associated with a resultant multi-component symbol that includes four or more symbol components; and (c) an award (greater than zero) associated with a resultant multi-component symbol that includes zero symbol components. Thus, in this example embodiment, the resultant multi-component symbols most likely to be determined include one, two, or three symbol components and (in this example) no award is provided for these common resultant multi-component symbols. On the other hand, awards are provided for relatively rarer resultant multi-component symbols including fewer than one or greater than three symbol components.

In one embodiment, the plurality of symbols includes a WILD symbol. In this embodiment, the gaming system may randomly generate and display the WILD symbol at one of the symbol component locations instead of or in addition to one of the symbol components. In one embodiment the gaming system may randomly generate and display the WILD symbol at one of the symbol display areas rather than one of the multi-component symbols. When a WILD symbol is generated and displayed at one of the symbol display areas or symbol component locations, the WILD symbol acts as the multi-component symbol or symbol component that will maximize the player's award.

In another embodiment, the gaming system includes a BONUS symbol. In this embodiment, the gaming system may randomly generate and display the BONUS symbol at one of the symbol display areas instead of or in addition to one of the multi-component symbols. In one embodiment, the gaming system may randomly generate and display the BONUS symbol at one of the symbol component locations instead of or in addition to one of the symbol components. In one embodiment, the BONUS symbol triggers one or more free plays of a secondary or bonus game, which may be the game providing multi-component symbols and awards based on common components of the present disclosure or any other suitable game. In another embodiment, the gaming system provides the player with a bonus award when the BONUS symbol is generated and displayed at one of the symbol display areas or symbol component locations. In another embodiment, the BONUS symbol acts as the WILD symbol described above.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is as follows:

1. A gaming system comprising:

at least one display device;

at least one input device;

at least one processor; and at least one memory device storing a plurality of instructions which, when executed by the at least one processor, cause the at least one processor to operate with the at least one display device and the at least one input device to:

(a) display a game including a plurality of different multi-component symbols, wherein:

(i) the multi-component symbols are displayable at a plurality of symbol display areas;

(ii) each of the multi-component symbols includes a plurality of symbol component locations; and (iii) for each of a plurality of the multi-component symbols, said multi-component symbol includes at least one of a plurality of different symbol components at at least one of the symbol component locations of said multi-component symbol; and (b) for a play of the game:

(i) randomly generate and display a plurality of the multi-component symbols at the symbol display areas, wherein, for each of a designated number of the displayed multi-component symbols, the designated number being at least two, each of at least one of the symbol component locations of said displayed multi-component symbol corresponds to one of the symbol component locations of each of the other displayed multi-component symbols of the designated number of the displayed multi-component symbols;

(ii) determine a quantity of the symbol component locations of a first one of the displayed multi-component symbols of the designated number of the displayed multi-component symbols that:

(A) display one of the symbol components, and (B) correspond to one of the symbol component locations of each of the other displayed multi-component symbols of the designated number of the displayed multi-component symbols that each display one of the symbol components that corresponds to said displayed symbol component;

(iii) determine any awards; and (iv) provide any determined awards.

2. The gaming system of claim 1, wherein identical symbol components correspond to one another.

3. The gaming system of claim 1, wherein any awards are determined based on the determined quantity.

4. The gaming system of claim 1, wherein, for each of the designated number of the displayed multi-component symbols, each of the symbol component locations of said displayed multi-component symbol corresponds to one of the symbol component locations of each of the other displayed multi-component symbols of the designated number of the displayed multi-component symbols.

5. The gaming system of claim 1, wherein the designated number is at least three.

6. The gaming system of claim 1, wherein the plurality of instructions, when executed by the at least one processor, cause the at least one processor to operate with the at least one display device to display a resultant multi-component symbol, the resultant multi-component symbol being based on the displayed multi-component symbols of the designated number of the displayed multi-component symbols.

7. The gaming system of claim 6, wherein the resultant multi-component symbol includes a plurality of symbol component locations, each of at least one of the symbol component locations of the resultant multi-component symbol corresponding to one of the symbol component locations of each of the displayed multi-component symbols of the designated number of the displayed multi-component symbols.

8. The gaming system of claim 7, wherein the plurality of instructions, when executed by the at least one processor, cause the at least one processor to operate with the at least one display device to, for each symbol component location of the resultant multi-component symbol, display a symbol component in said symbol component location if the symbol component locations of each of the displayed multi-component symbols that correspond to said symbol component location display symbol components that correspond to one another.

9. The gaming system of claim 1, wherein the plurality of instructions, when executed by the at least one processor, cause the at least one processor to, for a first one of a second designated number of the displayed multi-component symbols, the second designated number being at least two:

(a) determine a quantity of the symbol components of said first one of the displayed multi-component symbols of the second designated number that are also included in each of the other displayed multi-component symbols of the second designated number of the displayed multi-component symbols; and (b) determine at least one of any awards based on said quantity.

10. A method of operating a gaming system, said method comprising:

(a) causing at least one processor to execute a plurality of instructions to operate with at least one display device to display a game including a plurality of different multi-component symbols, wherein:

(i) the multi-component symbols are displayable at a plurality of symbol display areas;

(ii) each of the multi-component symbols includes a plurality of symbol component locations; and (iii) for each of a plurality of the multi-component symbols, said multi-component symbol includes at least one of a plurality of different symbol components at at least one of the symbol component locations of said multi-component symbol; and (b) for a play of the game:

(i) causing the at least one processor to execute the plurality of instructions to operate with the at least one display device to randomly generate and display a plurality of the multi-component symbols at the symbol display areas, wherein, for each of a designated number of the displayed multi-component symbols, the designated number being at least two, each of at least one of the symbol component locations of said displayed multi-component symbol corresponds to one of the symbol component locations of each of the other displayed multi-component symbols of the designated number of the displayed multi-component symbols;

(ii) causing the at least one processor to execute the plurality of instructions to determine a quantity of the symbol component locations of a first one of the displayed multi-component symbols of the designated number of the displayed multi-component symbols that:

(A) display one of the symbol components, and (B) correspond to one of the symbol component locations of each of the other displayed multi-component symbols of the designated number of the displayed multi-component symbols that each display one of the symbol components that corresponds to said displayed symbol component;

(iii) causing the at least one processor to execute the plurality of instructions to determine any awards; and (iv) causing the at least one processor to execute the plurality of instructions to cause any determined awards to be provided.

11. The method of claim 10, wherein identical symbol components correspond to one another.

12. The method of claim 10, wherein any awards are determined based on the determined quantity.

13. The method of claim 10, wherein, for each of the designated number of the displayed multi-component symbols, each of the symbol component locations of said displayed multi-component symbol corresponds to one of the symbol component locations of each of the other displayed multi-component symbols of the designated number of the displayed multi-component symbols.

14. The method of claim 10, wherein the designated number is at least three.

15. The method of claim 10, which includes causing the at least one processor to execute the plurality of instructions to operate with the at least one display device to display a resultant multi-component symbol, the resultant multi-component symbol being based on the displayed multi-component symbols of the designated number of the displayed multi-component symbols.

16. The method of claim 15, wherein the resultant multi-component symbol includes a plurality of symbol component locations, each of at least one of the symbol component locations of the resultant multi-component symbol corresponding to one of the symbol component locations of each of the displayed multi-component symbols of the designated number of the displayed multi-component symbols.

17. The method of claim 16, which includes causing the at least one processor to execute the plurality of instructions to operate with the at least one display device to, for each symbol component location of the resultant multi-component symbol, display a symbol component in said symbol component location if the symbol component locations of each of the displayed multi-component symbols that correspond to said symbol component location display symbol components that correspond to one another.

18. The method of claim 10, which includes causing the at least one processor to execute the plurality of instructions to, for a first one of a second designated number of the displayed multi-component symbols, the second designated number being at least two:

(a) determine a quantity of the symbol components of said first one of the displayed multi-component symbols of the second designated number that are also included in each of the other displayed multi-component symbols of the second designated number of the displayed multi-component symbols; and (b) determine at least one of any awards based on said quantity.

19. The method of claim 10, which is provided through a data network.

20. The method of claim 19, wherein the data network is the internet.

21. A non-transitory computer readable medium including a plurality of instructions which, when executed by at least one processor, cause the at least one processor to:

(a) cause at least one display device to display a game including a plurality of different multi-component symbols, wherein:

(i) the multi-component symbols are displayable at a plurality of symbol display areas;

(ii) each of the multi-component symbols includes a plurality of symbol component locations; and (iii) for each of a plurality of the multi-component symbols, said multi-component symbol includes at least one of a plurality of different symbol components at at least one of the symbol component locations of said multi-component symbol; and (b) for a play of the game:

(i) randomly generate and cause the at least one display device to display a plurality of the multi-component symbols at the symbol display areas, wherein, for each of a designated number of the displayed multi-component symbols, the designated number being at least two, each of at least one of the symbol component locations of said displayed multi-component symbol corresponds to one of the symbol component locations of each of the other displayed multi-component symbols of the designated number of the displayed multi-component symbols;

(ii) determine a quantity of the symbol component locations of a first one of the displayed multi-component symbols of the designated number of the displayed multi-component symbols that:

(A) display one of the symbol components, and (B) correspond to one of the symbol component locations of each of the other displayed multi-component symbols of the designated number of the displayed multi-component symbols that each display one of the symbol components that corresponds to said displayed symbol component;

(iii) determine any awards; and (iv) cause any determined awards to be provided.

22. The non-transitory computer readable medium of claim 21, wherein identical symbol components correspond to one another.

23. The non-transitory computer readable medium of claim 21, wherein any awards are determined based on the determined quantity.

24. The non-transitory computer readable medium of claim 21, wherein, for each of the designated number of the displayed multi-component symbols, each of the symbol component locations of said displayed multi-component symbol corresponds to one of the symbol component locations of each of the other displayed multi-component symbols of the designated number of the displayed multi-component symbols.

25. The non-transitory computer readable medium of claim 21, wherein the designated number is at least three.

26. The non-transitory computer readable medium of claim 21, wherein the plurality of instructions, when executed by the at least one processor, cause the at least one processor to cause the at least one display device to display a resultant multi-component symbol, the resultant multi-component symbol being based on the displayed multi-component symbols of the designated number of the displayed multi-component symbols.

27. The non-transitory computer readable medium of claim 26, wherein the resultant multi-component symbol includes a plurality of symbol component locations, each of at least one of the symbol component locations of the resultant multi-component symbol corresponding to one of the symbol component locations of each of the displayed multi-component symbols of the designated number of the displayed multi-component symbols.

28. The non-transitory computer readable medium of claim 27, wherein the plurality of instructions, when executed by the at least one processor, cause the at least one processor to cause the at least one display device to, for each symbol component location of the resultant multi-component symbol, display a symbol component in said symbol component location if the symbol component locations of each of the displayed multi-component symbols that correspond to said symbol component location display symbol components that correspond to one another.

29. The non-transitory computer readable medium of claim 21, wherein the plurality of instructions, when executed by the at least one processor, cause the at least one processor to, for a first one of a second designated number of the displayed multi-component symbols, the second designated number being at least two:

(a) determine a quantity of the symbol components of said first one of the displayed multi-component symbols of the second designated number that are also included in each of the other displayed multi-component symbols of the second designated number of the displayed multi-component symbols; and (b) determine at least one of any awards based on said quantity.

* * * * *